Oct. 17, 1967 A. P. RINFRET ET AL 3,347,745
PROCESS FOR FREEZING ERYTHROCYTES
Filed Dec. 6, 1963 9 Sheets-Sheet 1

INVENTORS
ARTHUR P. RINFRET
CLEMENT W. COWLEY
GERALD F. DOEBBLER
BY Barnwell R. King
ATTORNEY

HEAT TRANSFER RATES IN BOILING LIQUID NITROGEN
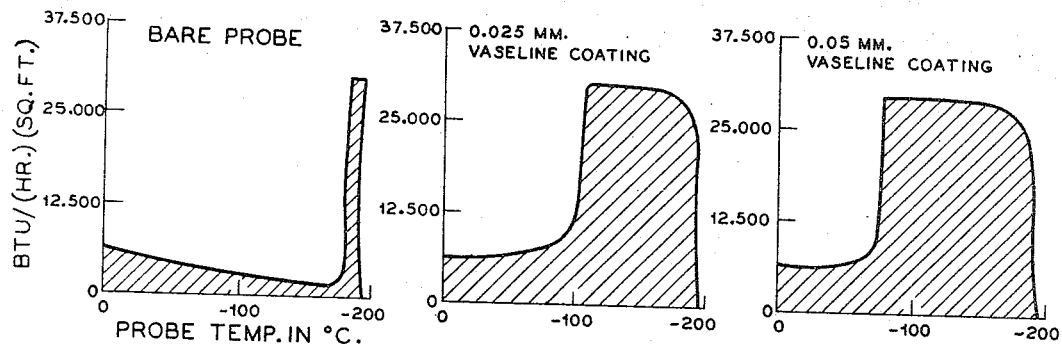
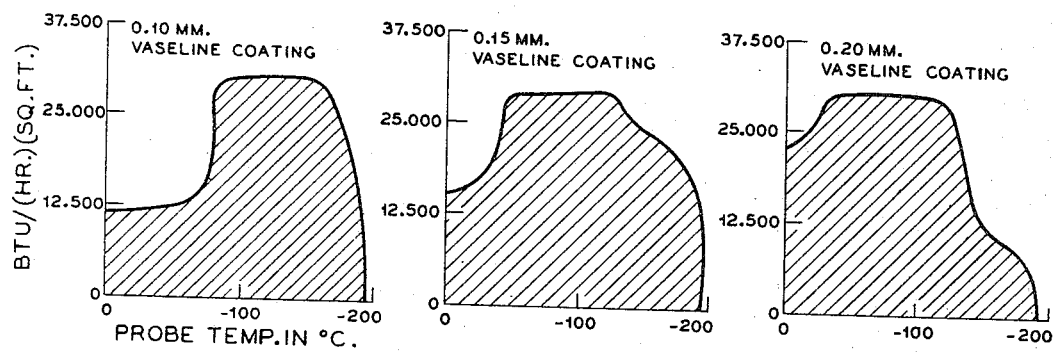
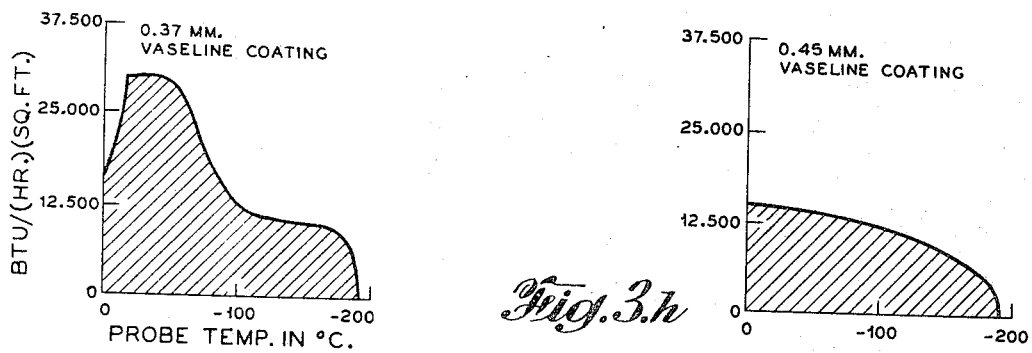

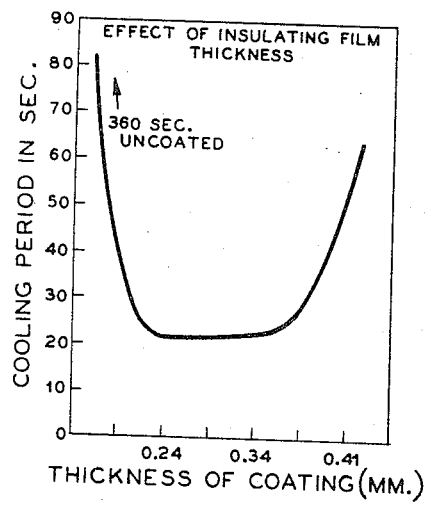
Fig.6.a
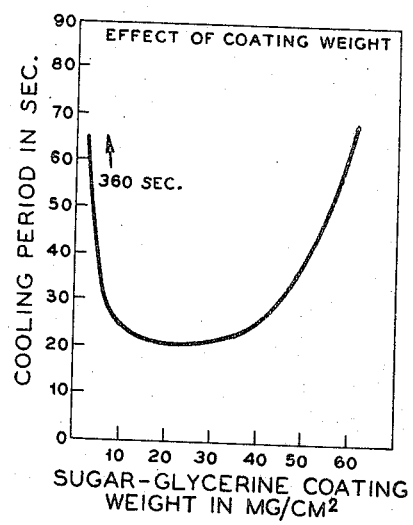
Fig.6.b
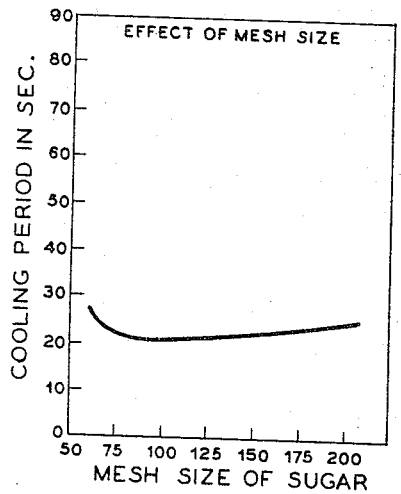
Fig.6.c
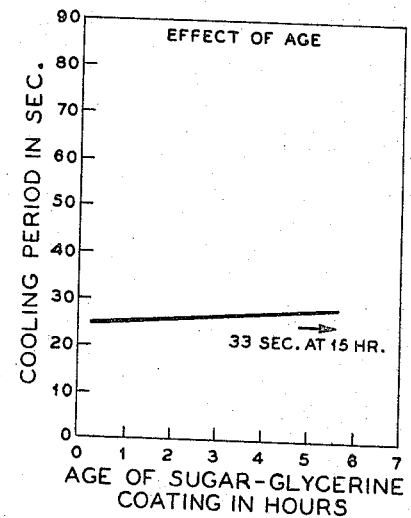
Fig.6.d

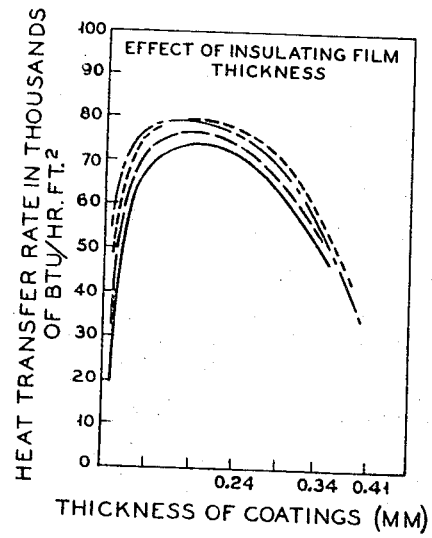
*Fig. 7.a*
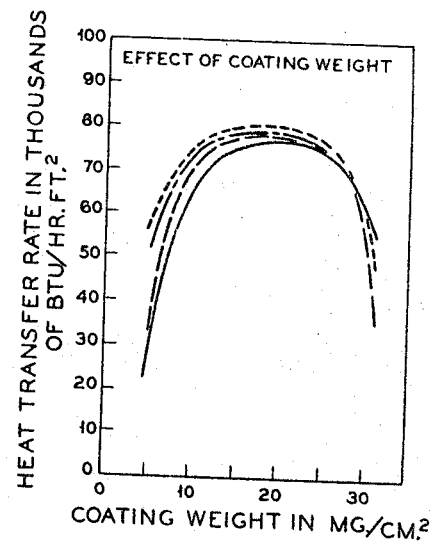
*Fig. 7.b*
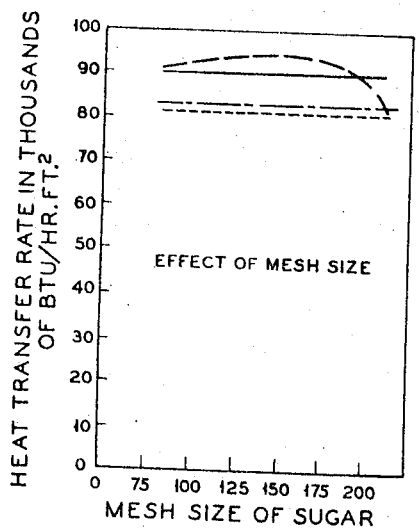
*Fig. 7.c*
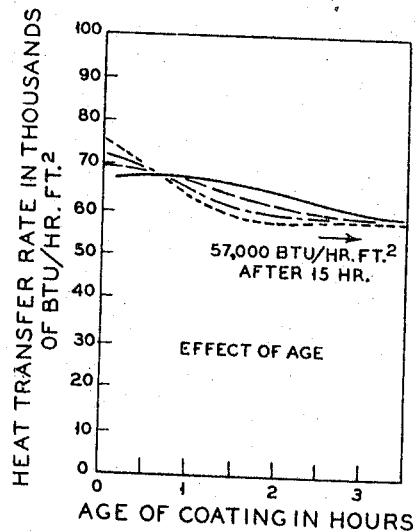
*Fig. 7.d*
```
           LEGEND
    SPECIMEN TEMPERATURE
    ――――――――――――― 0°C.
    ― ― ― ― ― ― ― -25°C.
    ―・―・―・―・― -50°C.
    ------------- -75°C.
```
INVENTORS
ARTHUR P. RINFRET
CLEMENT W. COWLEY
GERALD F. DOEBBLER

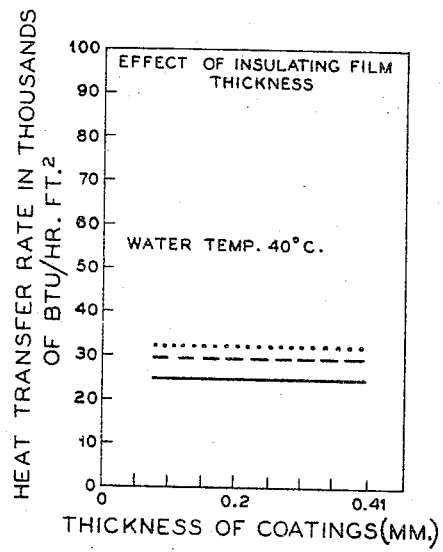
Fig. 8.a
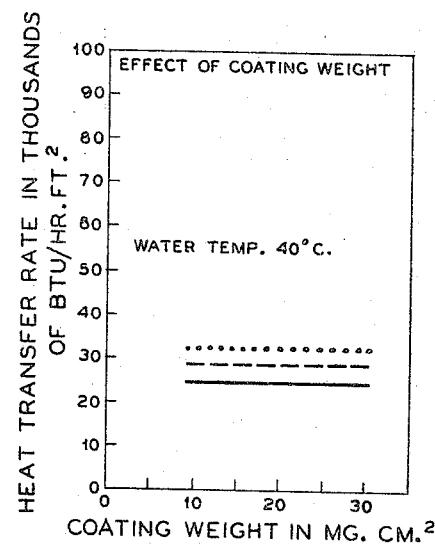
Fig. 8.b
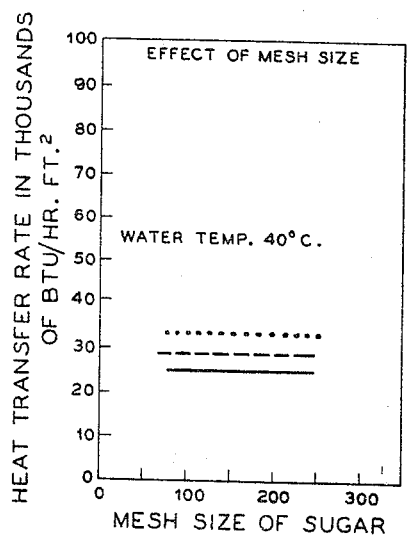
Fig. 8.c
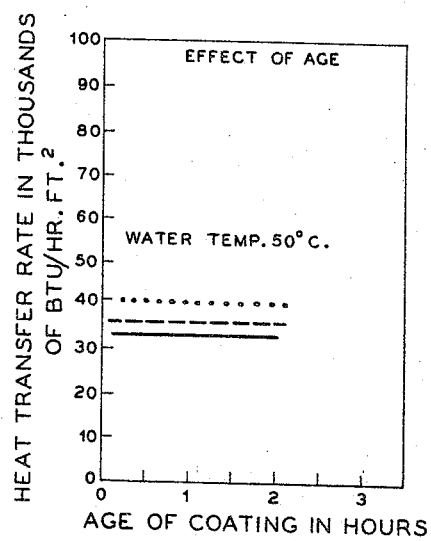
Fig. 8.d

INVENTORS
ARTHUR P. RINFRET
CLEMENT W. COWLEY
GERALD F. DOEBBLER

Oct. 17, 1967  A. P. RINFRET ETAL  3,347,745
PROCESS FOR FREEZING ERYTHROCYTES

Filed Dec. 6, 1963  9 Sheets-Sheet 9

INVENTORS
ARTHUR P. RINFRET
CLEMENT W. COWLEY
GERALD F. DOEBBLER
BY Barnwell P. King
ATTORNEY United States Patent Office 3,347,745
Patented Oct. 17, 1967

3,347,745
PROCESS FOR FREEZING ERYTHROCYTES
Arthur P. Rinfret, Buffalo, Clement W. Cowley, Tonawanda, and Gerald F. Doebbler, Buffalo, N.Y., assignors to Union Carbide Corporation, a corporation of New York
Filed Dec. 6, 1963, Ser. No. 333,786
14 Claims. (Cl. 167—74)

This application is a continuation-in-part of copending application Serial Nos. 851,711, filed November 9, 1959, and 104,800 filed April 24, 1961, both of which are now abandoned.

This invention relates to the preservation of human erythrocytes, that is human red blood cells. More particularly, the invention is directed to a process for the freeze-preservation of human erythrocytes in bulk quantities at low temperatures in which extracellular solutes are used as protective additives for the erythrocytes.

The preservation of blood from degradation on storing has been a constant problem facing scientists. The maintenance of blood banks and the desirability of storing whole blood in huge quantities for use in the event of catastrophe has made imperative the need for a system for the extended preservation of stored blood.

The primary viable constituents in blood are the erythrocytes (red blood cells). Hence, the problem of preserving blood basically relates to the preservation of erythrocytes. The erythrocytes are globular in form and contain a special kind of cytoplasm enclosed in a semipermeable membrane. This mebrane preserves the integrity of the enclosed protein and the electrolyte content of the contained cytoplasm. The membrane is ductile, but essentially non-elastic and thus has a critical maximum volume beyond which its integrity is damaged. This damage of the membrane, called hemolysis, results in the release of the oxygen-carrying element of the erythrocytes, i.e. hemoglobin, into the blood plasma where it cannot function to carry oxygen and carbon dioxide. The amount of hemoglobin released from a given number of cells provides a measure of efficiency of various blood preservation processes. The lower the amount of hemoglobin released, the greater the efficiency of the process and the apparatus for preserving the cells.

Normally, i.e., in the circulatory system of the body, erythrocytes have a life span of between about 100 days and 120 days. However, outside the body, an erythrocyte deteriorates much more rapidly. An erythrocyte has its own supporting metabolism and outside the body it carries on its metabolic processes until the blood sugar is depleted and converted to lactic acid. As this occurs, the substances and processes which are essential to the maintenance of the cell structure are exhausted. In addition the pH of the plasma is lowered to an unsatisfactory level by the accumulation of lactic acid. The osmotic balance between the intracellular material and the extracellular material is soon destroyed in drawn blood, and water from the plasma diffuses into the cell causing abnormal swelling and eventual membrane rupture. These changes occur rapidly at room temperature.

A number of processes have been suggested for the preservation of whole blood. For example, one process involves the collection of blood from a donor in an acid citrate-dextrose (ACD) anticoagulant solution, thereafter followed by refrigeration at between 4° C. and 6° C. This process, however, only allows the safe storage of whole blood for about three weeks. At the end of that time, although hemolysis may not yet be evident, the degradative processes have proceeded to a point where as many as 30 percent of the erythrocytes may be nonviable and will be promptly removed from circulation if transfused. This amount of degeneration is below acceptable levels, and it has proven impossible to stockpile such blood since each unit must be replaced every three weeks.

Experimentation with small quantities of whole blood, up to a few milliliters, in recent years has indicated that a much longer period of storage without progressive degeneration is feasible at a sufficiently low temperature where the metabolic process is essentially stopped. It has also been discovered, however, that indiscriminant cooling and warming of erythrocytes in the temperature range of 0° C.–50° C. causes total hemolysis. Present analysis ascribes this hemolysis to the development of ice crystals in the extracellular spaces between the erythrocytes which withdraw pure water from solution and concentrate it between the erythrocytes. In effect, the erythrocytes are dehydrated and the concentrated intracellular solutes remaining, particularly salt, cause destruction such as the denaturing of protein, especially lipoprotein. The goal of prior experimentation with freeze-preservation techniques, therefore, has been to avoid erythrocyte injury by preventing the degradative biochemical effects of high salt concentration concomitant with cooling the erythrocytes through the 0° C.–50° C. temperature range.

One prior method of preventing such freeze-thaw hemolysis is to carry out the freezing and thawing at ultra-rapid rates on the order of hundreds of degrees C. per second such that insufficient time exists for denaturation to occur. The physical heat transfer problems involved, however, restrict the successful application of this technique to blood volumes having thicknesses less than about the size of a blood droplet. Consequently, such techniques are physically limited to experimetnal use and not to large scale practical, bulk preservation systems.

Another prior method is to reduce salt concentration by reducing the amount of ice formed during freezing by the addition of a suitable protective solute such as glycerine. In order to bind the water such that a lethal salt concentration is avoided, however, the protective additive must be able to permeate into the erythrocyte and must be provided in high concentrations up to 50 percent and even higher. At such concentrations, the cooling and warming steps of the freze-preservation process have been successfully carried out at relatively slow rates on the order of 1° C. or less. At such high concentrations, however, the protective additives must be removed before the erythrocytes can be safely transfused. The greatest obstacle to usage of such intracellular additives as glycerine, therefore ,is the difficulty of subsequently removing the additive without hemolyzing the erythrocytes which survived freezing and thawing. All recovery methods developed to date require a complex procedure of washing the erythrocytes until the glycerine has permeated out through the erythrocyte membranes and removed, usually leaving a suspension of erythrocytes in isotonic saline without the blood plasma. Such a complex procedure has thus far barred the freeze-preservation of whole blood using glycerine for blood banking.

Another prior method of freeze-preservation involves the use of relatively low concentrations of sugar solutes as protective additives which may be intracellular such as glucose, or mixtures of intracellular and extracellular sugars (non permeable solutes) such as glucose and lactose, respectively, at rates intermediate the two aforementioned methods on the order of a few degrees C. per second. As with the aforementioned ultra-rapid freze-preservation technique, the physical heat transfer problems involved with rates on the order of a few degrees C. per second have heretofore also limited the blood volumes containing sugar solutes to those having thicknesses on the order of a few millimeters. Also, the amount of sugar solute required by this rapid freeze-preservation technique would necessitate the use of a complex washing process as in the aforementioned slow freeze preservation technique if frozen and thawed blood in volumes larger than a few milliliters were to be transfused. Consquently, the use of sugar solutes in freeze-preservation processes is as yet not practical for blood banking.

Accordingly, it is an object of this invention to provide a system for preserving human erythrocytes in bulk quantities, meaning quantities of ½–1 pint and larger, which is free from the disadvantages of processes heretofore known. Another object of this invention is to provide a system whereby mixtures of human erythrocytes and polymeric protective additives can be preserved at low temperatures. A further object of this invention is to provide a process whereby such preserved mixtures may be transfused in the required quantities without removal of protective additives. These and other objects and advantages of this invention will be apparent from the following description, appended claims and drawings of which:

FIG. 3 is a series of heat transfer rate curves for various thicknesses of insulating film coatings;

FIG. 6 is a series of cooling curves for sugar-glycerine coatings showing the effect of several variables over a temperature range of 25° C. to −196° C.;

FIG. 7 is a series of cooling curves for sugar-glycerine coatings showing the effect of several variables over a temperature range of 0 to −75° C.;

FIG. 8 is a series of warming curves for sugar-glycerine coatings showing the effect of the same variables as in FIG. 7 over a temperature range of −75° C. to 0° C.;

Figure 1:
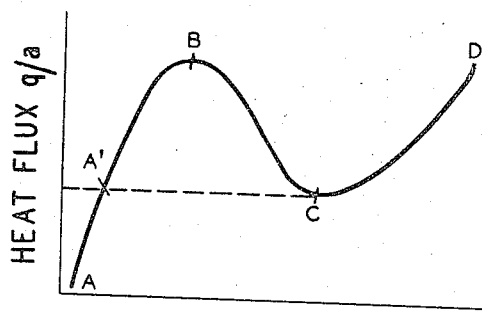
FIG. 1 is a boiling curve showing a plot of heat flux against the temperature difference between the surface of a solid and that of a boiling liquid.

The following is a glossary of terms employed in the description of the invention and in the claims:

Red Blood Cell (RBC) Recovery—The in vitro amount of nonhemolyzed erythrocytes, expressed in percent, which remain after freezing and thawing; the measure of hemolysis being obtained by measure of the total hemoglobin of a sample of unprocessed blood as compared with the hemoglobin of the supernatant obtained by centrifugation of frozen and thawed samples.

Red Blood Cell (RBC) Survival—The in vivo amount of frozen and thawed erythrocytes, expressed in percent, which remain in circulation in the blood stream; the measure of survival being obtained by radioisotope tagging of a sample of frozen and thawed test red cells before infusion and the subsequent observation of the tag level in the circulation; the degree of dilution of the tagged test cells in the circulation of the recipient being compared with the degree of dilution of a control sample of unprocessed red cells previously injected in the same recipient.

Hematocrit—The volumetric ratio, expressed in percent, of blood cells (erythrocytes, leucocytes and thrombocytes) to the total volume of cells and cell-containing suspending medium.

Normal Hematocrit—the hematocrit of human whole blood, generally about 45%.

Isotonic Saline Solution—0.85 gram sodium chloride (NaCl) in water to a total of 100 milliliters; such solution exhibiting the same osmotic pressure as normal red cells.

Resuspension Stability—The in vitro amount of non-hemolyzed, frozen and thawed erythrocytes, expressed in percent, which remain after dilution in forty-fold excess, or greater, of isotonic saline or other medium; the measure of hemolysis being obtained by measure of the free hemoglobin of the supernatant obtained by centrifugation of a sample of frozen and thawed blood as compared with the free hemoglobin in the isotonic saline obtained by centrifugation of a diluted sample of frozen and thawed blood.

Efficiencies of Process (EOP)—Refer to erythrocyte recoveries after all losses during freezing, thawing, and resuspension are taken into account. *Direct recovery* times *resuspension recovery* equals EOP.

Concentration—The amount of an ingredient (usually a protective additive) in a medium (usually the suspending medium for the erythocytes) expressed as a percent (either by weight or by volume as indicated).

Final Mixture Concentration—The concentration of an ingredient (usually a protective additive) in the mixture including erythrocytes expressed as a percent computed arithmetically from the concentration of the ingredient in its medium and the relative quantities of the ingredient-containing medium and the erythrocyte medium.

The prime objective of the present invention of providing a bulk blood preservation system which employs simple and rapid techniques, as would be required under large scale disaster conditions, requires that the compounds combined with the erythrocytes, to provide protection of the erythrocytes during freezing and thawing, be acceptable as transfusible substances; maintain the highest degree of erythrocyte osmotic stability, viability and functionality; and protect a very high percentage of the erythrocytes from lysis during the preservation process so that the amount of free hemoglobin and cellular debris does not exceed tolerable limits during transfusion of multiple units of preserved erythrocytes. It has been discovered that a high recovery of intact erythrocytes is achieved only when frozen in the presence of a medium containing a minimum of about 10% by weight of an extracellular protective additive; that osmotically stable cell suspensions are recovered only with extracellular protective additives which do not enter the cell; and that carefully controlled, rapid rates of heat transfer are necessary during freezing and thawing to get a high recovery of stable cells in the presence of extracellular protective additives.

An erythrocyte preparation with high recovery of intact cells on thawing and high stability on transfusion is provided by the present invention by the use of extracellular protective additives of the water soluble high molecular weight type such as polyvinylpyrrolidone (PVP), dextrose, and like polymers at a final mixture concentration between about 3–20% w./v. in combination wtih turbulent agitation during cooling and warming. Such substances do not penetrate the erythrocyte membrane and can thus be rapidly removed by simple centrifuging, washing not being required, or left in the preserved erythrocytes without risk of large scale osmotic lysis during transfusion. Furthermore, due to their high molecular weight, their molar concentration in a recipient's blood stream is considerably lower than prior additives and there is considerably less opportunity for the additive to effect the recipient's blood stream than heretofore possible. These discoveries enabled the development of three basic processes which are particularly suited to the use of polymeric additives.

The present invention provides a system for the freeze-preservation of human erythrocytes in bulk quantities of transfusion unit size or larger by any of three basic processes, all of which involve freezing the erythrocytes in containers immersed in a low temperature refrigerant bath and thawing them by immersing the container in a warm bath. Process I involves the freeze-preservation of whole blood, having its normal amount of erythrocytes, in the presence of an extracellular protective additive-containing medium. Process II involves separating the erythrocytes from whole blood such as by means of conventional centrifugation, and resuspending the erythrocytes in an extracellular protective additive-containing medium prior to their freeze-preservation. Process III involves the freeze-preservation of the erythrocyte fraction of whole blood in the presence of part or all of its plasma and an extracellular protective additive-containing medium.

An essential processing parameter for all three of these basic processes is that the erythrocyte-containing mixture be turbulently agitated, such as by rapid shaking both during freezing, such that a solid shell of the frozen mixture is formed on the inner surfaces of the mixture container (called shell freezing), and during thawing. Agitation during processing has been discovered to minimize the dependence of freeze-preservation results on the mass thickness of the erythrocyte-containing mixture which has heretofore restricted prior methods to preserving mixture volumes of sufficiently small cross-section such that the erythrocyte layer furthest from the mixture container inner surface is within about 5 mm. of such surface. With the present invention, larger mixture volumes merely require, in general, a greater degree of agitation to achieve acceptable results and the mass thickness of the frozen shell may be greater than about 5 mm. (up to at least about 10 mm.) without deleteriously affecting the results. Furthermore, the present invention minimizes the necessity of maintaining an absolutely uniform cross-section of the frozen mass which has heretofore been a requisite of prior freeze-preservation methods. The fact that a 5 mm. mass thickness is not critical when the mixture is turbulently agitated during freezing, but is critical when the mixture is stagnantly frozen, indicates that turbulent agitation contributes to the viability of the processed erythrocytes in some unexpected manner independent of heat transfer considerations.

Figure 2:
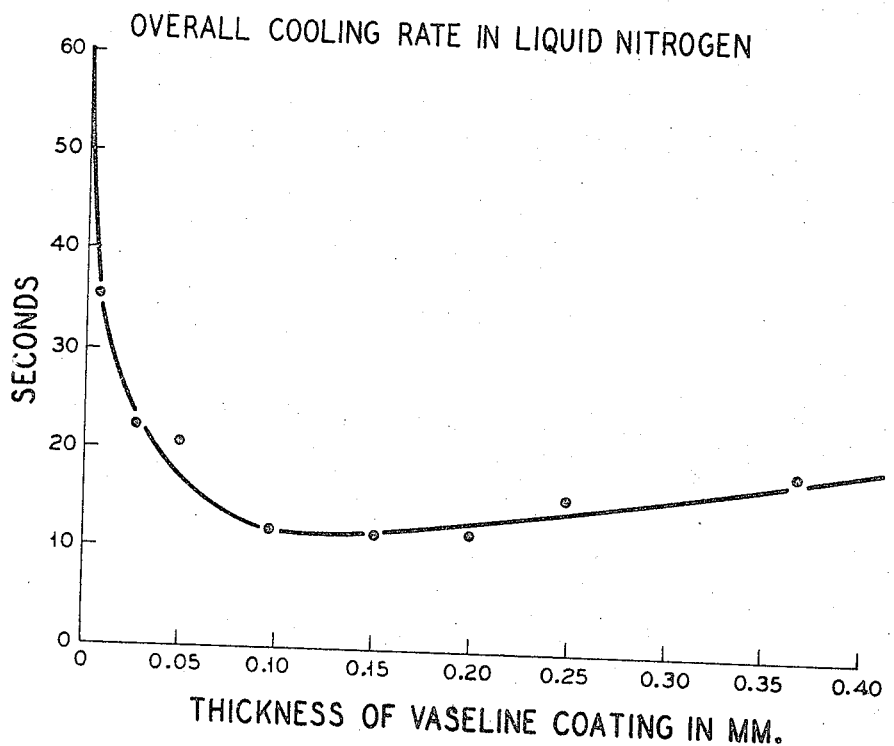
FIG. 2 is a liquid nitrogen cooling rate curve in which cooling time is plotted against the insulating film coating thickness.
Figure 4:
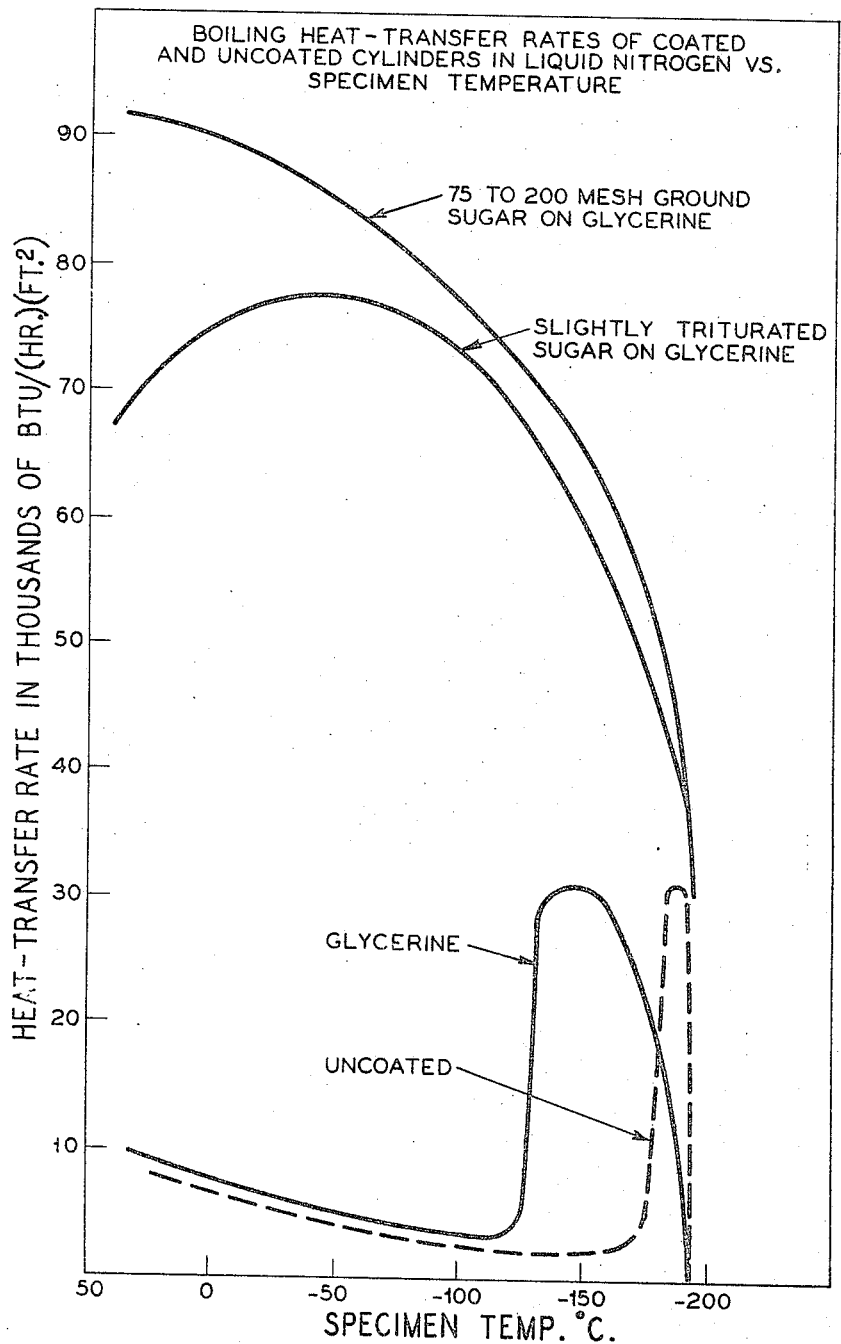
FIG. 4 is a series of boiling curves of various insulating coating materials.
Figure 5:
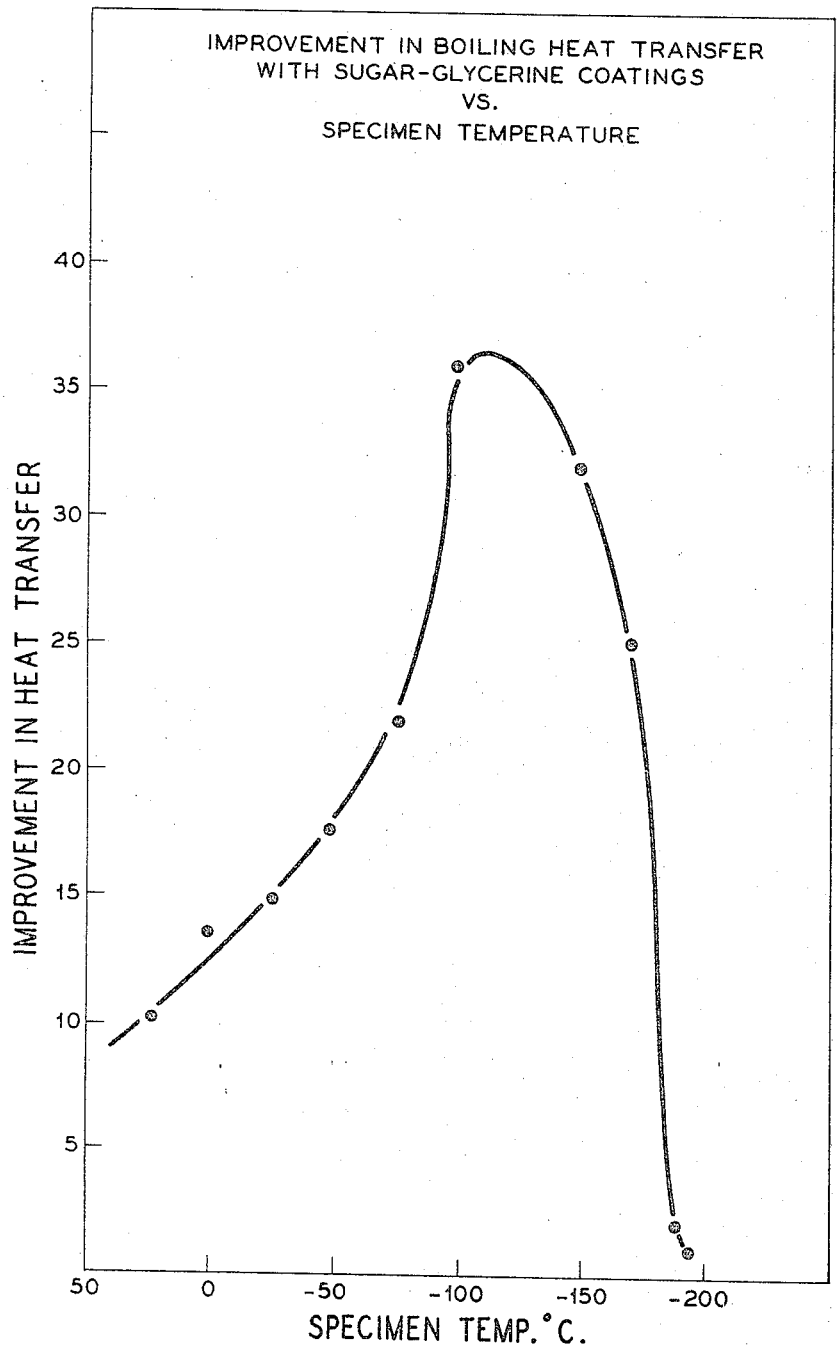
FIG. 5 is a boiling curve for a specimen having a sugar-glycerine coating.
Figure 9:
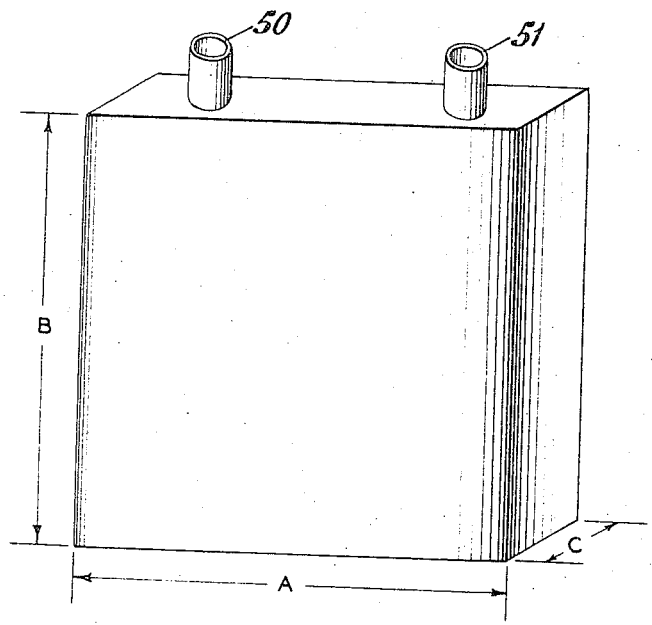
FIG. 9 is a perspective view looking downwardly on a rectangular-type container for storing biological substances according to the present invention.
Figure 10:
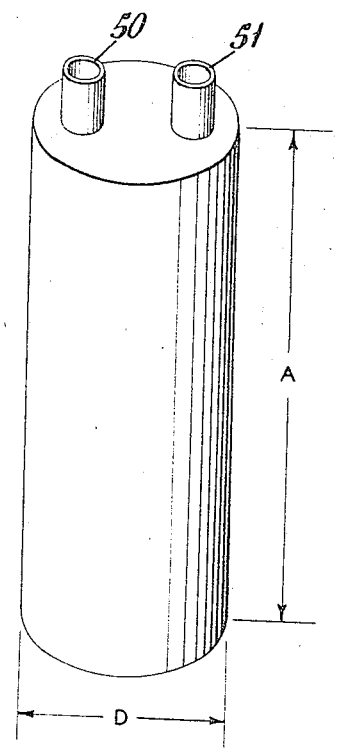
FIG. 10 is a perspective view looking downwardly on a novel cylindrical-type container for storing biological substances according to the present invention.
Figure 11:
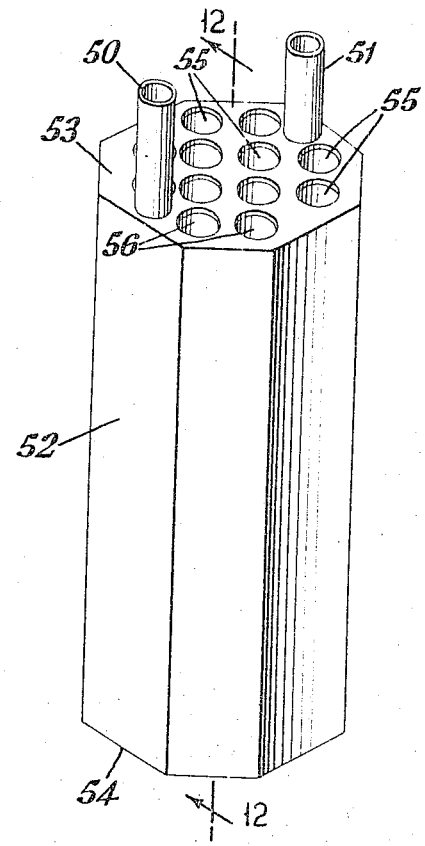
FIG. 11 is a perspective view looking downwardly on still another novel container for storing biological substances.
Figure 12:
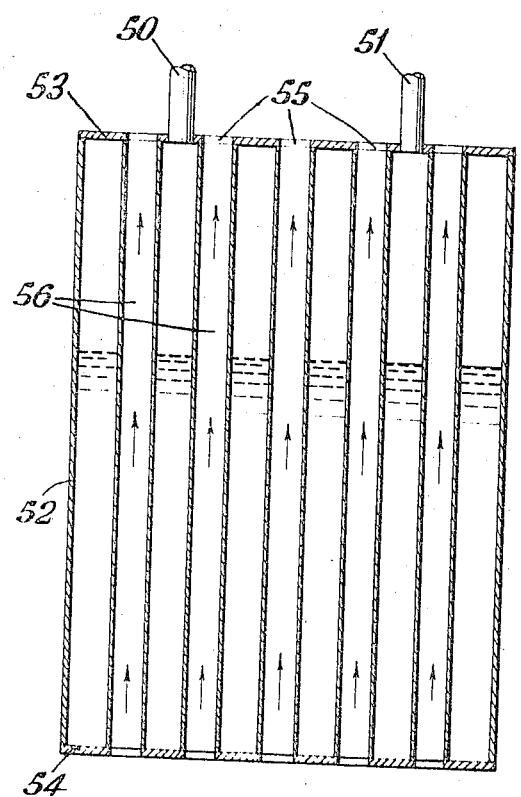
FIG. 12 is a view of a longitudinal cross-section of the container shown in FIG. 11, taken along the line 12—12.

Preferably, the rate of heat transfer between the refrigerant and the stored mixture is at least 14,000 B.t.u./(hr.) (sq. ft.) and preferably at least 24,000 B.t.u./(hr.) (sq. ft.) during the entire freezing step so that freezing may be obtained in a sufficiently short period for high erythrocyte (RBC) recoveries on the order of at least 90%. In order to obtain the desired heat transfer rate, the erythrocyte mixture storage container may be coated with a heat transfer promoting coating in the form of a thin insulating film having sufficient insulating power to adjust the temperature difference between the heat rejecting surface of the coated solid and a boiling refrigerating medium to a value where more efficient heat transfer will result as illustrated in FIGURES 1–8. The heat transfer rate may be further improved by applying a layer of powderous material on the previously mentioned thin insulating film which then serves as an undercoating as also illustrated in FIGURES 1–8. The powderous material layer is believed to further increase the heat transfer rate for at least two reasons; first, the discontinuity of the surface promotes bubble formation, and secondly, the exposed portions of the powder particles cool down rapidly whereby boiling in the nucleate regime is quickly established. Glycerine, for example, is admirably suited as a material for forming the thin insulating film, and finely divided silica, for example, has been found particularly effective in providing the powderous material layer. The undercoating and powderous layer may be applied to the outer surface of the container either before or after the container is filled with the erythrocyte-containing fluid.

The following materials in at least the indicated thicknesses are among those suitable for employment as the insulating film coating:

| | Mm. |
|---|---|
| (1) "Poxalloy" adhesive | 0.04–0.75 |
| (2) Clear varnish | 0.04–0.10 |
| (3) Vulcanized rubber | 0.04–0.23 |
| (4) House paraffin | 0.02–0.34 |
| (5) Rubber paraffin | 0.03–0.39 |
| (6) Paper masking tape | 0.30–0.90 |
| (7) Rubber electricians tape | 0.30–0.90 |
| (8) Vaseline | 0.01–0.95 |
| (9) Asbestos | 0.25–0.95 |
| (10) Sodium silicate | 0.11–0.17 |
| (11) Kaolin | 0.11 |
| (12) Plaster of Paris | 0.19 |

It has been found that the heat transfer rate between the refrigerant and the container walls may be even further improved by applying a layer of powderous material to the thin insulating film coating. The powder layer provides a discontinuous surface for the promotion of bubble formation and the exposed portions of the powder particles cool down rapidly.

In addition to finely divided silica such as silica aerogel having agglomerate particle sizes of less than about 5 microns and crystalline zeolite molecular sieves A and X, both in agglomerate particle sizes of 2–4 microns, sugar powders are suitable. Silica aerogel, known commercially as "Santocel," is preferred over sugar because it is more readily available in the ultra-fine sizes which are desired for best reproducibility in actual practice, while it may be necessary to grind sugar down to the correct mesh sizes in order to obtain an optimum coating.

It should be recognized that when a powder layer is to be employed, there is an additional requirement for suitable film coatings. That is, the undercoating must be formed of material which will receive and hold the powder. Both glycerine and an aqueous solution of polyvinylpyrrolidone have been successfully used. Glycerine has been employed alone and also diluted with methanol. Other suitable undercoating materials include oils in general, and the silicone fluids. A water soluble undercoating is generally preferred so that it will wash off during the thawing step. Each of the above-mentioned materials is either water soluble or may be obtained in a water soluble form. For example, many detergent oils are available. The solvent or diluent such as the methanol mentioned above can also be varied. For example, ethanol, water or any substance that will not impair the water stripping of the film may be employed. The function of the diluent is to adjust the properties of the insulating film (a) to produce a good adherent uniform film according to whether it is applied by spraying, dipping or otherwise, (b) to keep it fluid at least until the powder addition is made, and (c) in some instances, to act as a plasticizer and help prevent drying out and flaking off during the cooling step.

The thin insulating film and powderous layer may be applied to the outer walls of the erythrocyte mixture container in any convenient manner as, for example, by dipping the container into a solution containing the insulating material. In such case, the thickness of the insulating film may, for example, be controlled by adjusting the concentration of the solution and the number of dippings. However, the preferred method of applying the powderous layer is by spraying with a propellant gas onto the aged insulating film.

A refrigerant suitable for use in freezing the erythrocyte mixture must have a temperature of below about −100° C. to insure adequate recovery of the red blood cells. Liquid nitrogen is the preferred refrigerant, since it has the advantages of being relatively inert, safe to handle, and relatively inexpensive. It also has an exceedingly low boiling point, namely −196° C. at atmospheric pressure. The liquid nitrogen employed can, for example, be obtained by the well-known rectification of air. However, other refrigerants may also be employed. Among those liquids which may be used are liquid air (containing normal amounts of nitrogen), helium, neon, argon, and krypton.

Liquid nitrogen and the other low-boiling refrigerants are saturated fluids at atmospheric pressure, and boil violently when a warm object such as the erythrocyte mixture storage container is plunged therein. The heat transfer is dependent upon the temparature difference ($\Delta T$) between the fluid and the warm object as previously discussed. At very high values of $\Delta T$, a vapor film is forced around the warm container resulting in very poor heat transfer. This vapor film becomes less and less stable as the $\Delta T$ is decreased and the heat transfer improves. At the $\Delta T$ of about 3° C. (for liquid nitrogen), maximum heat transfer is attained and drops off as the $\Delta T$ is reduced to zero. The application of the aforedescribed coatings of the container outer walls allow the surface in contact with the liquid nitrogen to be cooled very rapidly and provide a $\Delta T$ value closer to 3° C.

In the shell-freezing method, wetting of substantially all of the inner heat transfer surfaces of the container with the erythrocyte-containing mixture to form the solid frozen outer shell may be achieved by any convenient means which turbulently agitates the mixture. For example, a rapid reciprocal shaking motion may be imparted to the container while the latter is being chilled.

During the freeze-preservation of erythrocytes it has been found that the total time the erythrocytes spend in the temperature region between 0° C. and −50° C. must be carefully controlled. This, of course, requires also the controlling of rewarming time after storage. The rewarming and subsequent thawing time can be materially reduced if the container is shaken while immersed in the warming bath. A convenient warming bath comprises warm water.

In the rewarming and thawing step, as soon as the relatively cold container is plunged into the warm water, a layer of thawed fluid is formed contiguous to the container wall. Since this layer has a heat conductivity of about one-third that of the solidified substance and much lower heat conductivity than that of the container wall, it immediately reduces the heat-transfer rate to the still-frozen portion of the mixture. However, the heat-transfer rate can be improved if the layer of thawed liquid is agitated. If the container is shaken during the warming and thawing step, relative motion is imparted to the thawed liquid and the solid shell which, in turn, improves the heat-transfer rate across said liquid layer.

To minimize heat-induced hemolysis of the erythrocytes, the temperature of the thawing is generally maintained at 37° C., but bath temperatures as high as 55° C., have been employed successfully.

While most quantities of preserved erythrocytes are intended for in vivo uses, the utility of the instant process is equally well applicable to in vitro uses of erythrocytes. An important example of applications of the latter type is the use of red blood cells for serological work in identifying anti-bodies in patients who may have transfusion reactions. For this work it is advantageous to have on hand a convenient supply of samples of erythrocytes of all types.

In order to meet the important requirement that thawed erythrocytes be transfusible with little or no post-thaw processing, it was found necessary to use a protective additive that does not enter the cell. Red cells in the presence of intra-cellular additives such as glucose, glycerol, or dimethylsulfoxide, at concentrations that afford protection, lyse immediately on infusion. A principal problem, then, was the selection of a protective additive that does not enter the red cell, affords protection during freezing and thawing, and is pharmacologically acceptable on infusion. Of the many materials tried, hydrophilic polymers and particularly polyvinylpyrrolidone (PVP) appeared most promising. PVP resulted in the highest recovery of intact cells capable of surviving to a high degree on infusion, and had been used for many years as a plasma volume expander without manifestation of acute effects. Dextran, human serum albumin and Haemaccel, although physiologically acceptable, did not give the same degree of protection.

Among the matters studied have been:

(1) Red Cell Stability
   (a) in vitro
   (b) in vivo
(2) Processing Variables
   (a) Protective additional concentrations
   (b) Freezing and thawing conditions Details of these studies are given in the following sections.

PROCESS I

Whole blood modified by addition of polymers such as PVP, Dextran, albumin, and the like to a final mixture concentration of 5–15% w./v. withstand rapid bulk freezing and thawing with the least alteration, the highest RBC recovery, and the greatest in vitro stability after thawing. Preferred final mixture concentrations of the protective additive are 6–10% w./v. and should not be greater than about 20% w./v. Above a polymeric protective additive final mixture concentration of 20% w./v., osmotic stability of processed erythrocytes is substantially reduced rendering the erythrocytes unsuitable for transfusion.

The whole blood can be obtained by conventional procedures, for example it can be drawn from a donor in one pint quantities into a suitable nontoxic anticoagulant medium such as citrate-containing anticoagulants, heparin, ethylene diamine tetraacetic acid (EDTA), acid citrate-dextrose (ACD), and the like. Coagulation of blood may also be avoided by defibrination of the drawn blood or by the removal of the contained calcium from whole blood by suitable ion-exchange techniques.

(A) DESCRIPTION OF PROCESS

In a preferred embodiment of Process I, 420 cc. of blood is drawn into 160 cc. of a solution containing 45% ACD-A and 26.5% PVP (Plasdone C) to give a total volume of 580 cc. and a final PVP concentration in the mixture of 7% w./v. The container is aluminum which is corrugated to give a high ratio of surface to volume, and has a volume of 1000 cc.

The container of blood is coated with a thin (0.004 in.) heat transfer-promoting layer of PVP and then immersed into liquid nitrogen while being rapidly shaken. This results in the formation of a shell of frozen blood 3–9 mm. thick. After immersion for 120 sec. the container is stored at −170° C. or below until needed.

Thawing is accomplished by shaking the container in a bath of water at 45° C. for about 75 sec., after which it is immediately withdrawn and stored at 4° C. until administered.

(B) STABILITY OF CELLS (1) IN VITRO MEASUREMENTS (a) *Recovery*

When red cells are frozen and thawed in the presence of plasma plus PVP, some of the cells lyse. The extent of lysis is determined by the concentration of PVP and the thermal regimen experienced by the cells. Under best conditions, 97% of the cells are reproducibly recovered intact, as measured by the loss of hemoglobin from cells. Potassium ion loss is greater than that resulting from lysis alone and is in the order of that of 21-day-old bank blood; being 22 meq./l. vs. 23 meq./l. for 21-day-old blood. Direct infusion of such a product introduces free hemoglobin and potassium ion into the circulation in addition to the PVP required for protection. This is discussed further in the next section.

(b) Resuspension Stability

Loss of hemoglobin and potassium from cells is a direct manifestation of cell damage. There is additional damage which is shown by the loss of cells on infusion and which can be demonstrated in vitro by diluting cells with isotonic saline. There is additional hemolysis, the extent of which can give an indication of the degree of trauma experienced by the cells. Preparations that give 97% recovery of intact cells on thawing may lose an additional 5 to 17% of the cells on resuspension in forty-fold excess (or greater) of isotonic saline. Those that show the largest additional hemolysis have the poorest survival on infusion, and those with small loss may, or may not, have good survival.

It appears, then, that in vitro tests do not distinguish unequivocally between preparations that will show the best in vivo survival and those that are poorer, but if they indicate a preparation is less stable, lower survivals will be obtained with it.

(2) IN VIVO MEASUREMENTS

(a) Survival After Infusion

The stability of processed cells in the circulation has been measured by the $Cr^{51}$—$Cr^{51}$ double tagging procedure. The recipient's red cell volume is determined from the dilution of a known volume of $Cr^{51}$—tagged unfrozen, autologous blood, and tagged frozen and thawed blood is then infused for measurement of survival.

Most of loss of cells occurs in the first few hours after transfusion.

(b) Mechanism of Loss of Red Cells Immediately Following Infusion

When intact cells disappear after infusion, they may be lysed in the circulation or may be removed in the RE system. Evidence against any marked lysis is given in Table I-2, which tabulates data obtained in one-pint transfusions. Column 8 represents the percentage of the total infused hemoglobin that is not accounted for as free hemoglobin in the plasma. It is equivalent to the recovery of intact cells after transfusion. Comparison (Column 9) of this value with the recovery of the cells before transfusion (Column 1) shows that stable cell preparations, as indicated by saline resuspension values of 87% or greater (Column 2), have lost less than 2% of their cells by lysis on transfusion. Although there are uncertainties in these measurements it is unlikely that much free hemoglobin has been removed from circulation in this time, for the haptoglobin-binding capacity has not been exceeded.

It would appear, then, that red cells frozen and thawed in the presence of plasma plus PVP are not removed primarily by lysis in the first 30 min. after transfusion when optimal processing conditions are used. A less stable preparation might well lose some of the population by intravascular lysis in the period immediately after transfusion.

TABLE I-2.—ONE-PINT TRANSFUSIONS
[Whole blood+PVT]

| 1 | 2 | 3 | 4 | 5 | 6 | 7 | 8 | 9 |
|---|---|---|---|---|---|---|---|---|
| Normal Recovery, Percent | Saline Yield (1:100), Percent | Volume Transfused, ml. | Amt. of Hemoglobin Transfused, g. | Post-Transfusion Plasma Vol., ml. | Plasma Hemoglobin 30-Min. Post-Trans., mg.-Percent | Total Circulating Hemoglobin 30-Min. Post-Trans., g. | 100 (1 Hgb circ.) Hgb infused | [(1)−(8)] |
| 96.8 | 88.7 | 386 | 35.5 | 2,558 | 68 | 1.74 | 95.1 | 1.7 |
| 95.5 | 84.1 | 390 | 38.2 | 2,678 | 19 | 2.44 | 93.6 | 1.9 |
| 95.6 | 86.8 | 381 | 34.2 | 2,740 | 49 | 1.34 | 96.1 | ~0 |
| 96.5 | 88.9 | 377 | 34.3 | 2,698 | 59 | 1.59 | 95.4 | 1.1 |
| 97.3 | 90.3 | 382 | 33.6 | 3,048 | 30 | 0.91 | .97.3 | 0 |
| 97.1 | 89.9 | 0 | | | | | | |
| 97.5 | 92.1 | 379 | 33.4 | 1,904 | 35 | 0.67 | 98.0 | ~0 |
| 97.1 | 90.8 | 383 | 39.1 | 2,333 | 48 | 1.12 | 97.1 | 0 |
| 96.2 | 87.5 | 0 | | | | | | |
| 97.3 | 89.4 | 269 | 24.2 | 2,197 | 37 | 0.81 | 96.7 | 0.6 |
| 96.5 | 85.0 | 395 | 38.0 | 2,639 | 95 | 2.50 | 93.4 | 3.1 |
| 95.5 | 85.7 | 386 | 38.2 | 2,819 | 84 | 2.37 | 93.8 | 1.7 |
| 96.8 | 86.5 | 387 | 37.9 | 2,462 | 71 | 1.75 | 95.4 | 1.4 |
| 96.8 | 88.5 | 384 | 34.9 | 2,601 | 66 | 1.72 | 95.1 | 1.7 |
| 97.2 | 87.6 | 384 | 38.4 | 2,465 | 70 | 1.72 | 95.5 | 1.7 |
| 96.3 | 84.3 | 380 | 36.4 | 2,467 | 77 | 1.90 | 94.8 | 1.5 |
| 95.1 | 81.6 | 396 | 37.6 | 2,860 | 70 | 2.00 | 94.7 | 0.4 |
| 96.3 | 85.0 | 391 | 37.2 | 1,767 | 87 | 1.54 | 95.9 | 0.4 |
| 96.1 | 85.1 | 390 | 41.8 | 2,384 | 88 | 2.10 | 95.0 | 1.1 |
| 96.0 | 85.7 | 395 | 39.9 | 2,327 | 99 | 2.30 | 94.2 | 1.8 |
| 95.8 | 83.7 | 396 | 41.9 | 2,558 | 100 | 2.56 | 93.9 | 1.9 |

Using the optimal combination of processing parameters—PVP concentration, freezing and thawing rates, and container size and geometry described above—an average of 80% of the cells intact after thawing have been found circulating 24 hrs. after transfusion. Representative data are given in Table I-1.

(c) Evaluation of Processing Parameters

When extra-cellular, polymeric protective additives, such as PVP, are used, stringent control of processing conditions is needed to give the highest recovery of stable cells in reproducible fashion. An important part of recent TABLE I-1.—AVERAGE IN VIRO SURVIVAL OF FROZEN AND THAWED BLOOD
Whole blood+ADC+7% w./v. PVP

| Blood Volume (ml.) | Container Size (ml.) | No. Tests | Recovery | Saline Stability | Survival | | | |
|---|---|---|---|---|---|---|---|---|
| | | | | | 30 min. | 24 hr. | 48 hr. | 72 hr. |
| 50 | 110 | 6 | 96±1 | 87±2 | 94±4 | 79±4 | | |
| 250 | 500 | 17 | 97±1 | 89±2 | 93±8 | 82±7 | 80±8 | 75±7 |
| 450 | 1,000 | 21 | 95.6±0.5 | 86±2.7 | 86±1.7 | 79±9 | 71±7 | 67±7 | studies has been the determination of optimum processing conditions and the degree of variability permitted, using in vivo survival as the measure of stability. Variation in mixture volume from 10 to 60% of container capacity indicated that red cell recovery is sensitive to volume only below about 30%.

(1) *PVP concentration.*—The minimum final mixture concentration of PVP which gives very high stability of red cells has been found to be 7 g. per 100 ml. (7% w./v.) final red cell suspension. Variation in the freezing and thawing conditions have not resulted in the preferred use of a lower concentration.

(2) *PVP molecular weight.*—All recent preparations evaluated by clinical assay have been made with Plasdone C, K–30 PVP. This has an average molecular weight of 40,000. It has been established that PVP K–25 (from Light and Co.) and PVP K–22 (from Antara Products), both of about 25,000 average molecular weight, give cells of comparable stability as measured by in vitro tests (Table I-3).

TABLE I-3.—IN VITRO STABILITY OF RED CELLS PROTECTED BY VARIOUS PVP'S

| PVP | Post-Thaw Recovery | Saline Resuspension Recovery |
|---|---|---|
| Plasdone C (avg. mol. wt., 40,000) | 96.3 | 90.3 |
| K–22 (Antara) (avg. mol. wt., 24,500) | 96.4 | 87.8 |
| K–25 (Light and Co.)(avg. mol. wt., 24,500) | 96.2 | 88.8 |

PVP was present in whole blood-ACD at a concentration of 7% w./v. Fifty-milliliter samples were processed under identical conditions.

(3) *Freezing conditions.*—Strict control of the freezing conditions continues to be necessary for reproducible attainment of high recovery of stable cells. Immersion of blood containers in a 500-centistoke solution of PVP K–30 in methanol gives a coating that results in optimal heat transfer. Faster or slower cooling than is obtained with this mixture gives poorer results. Shaking in liquid nitrogen during freezing to give a shell of frozen blood has proved to be necessary, for in no test without shaking was a high recovery of stable cells achieved.

(4) *Thawing conditions.*—Shaking of a container of frozen blood in a warm water bath to thaw gives best results.

(5) *Collection of blood.*—Blood has been collected in glass bottles or plastic packs and then transferred to the metal container or collected directly into the metal container without apparent difference in results. Blood has been added to a mixture of ACD and PVP, or PVP has been added to blood and ACD, again without noticeable difference.

There have been differences noted among the recoveries and osmotic stabilities after freezing and thawing of bloods collected by various agencies (Table 1–4). There has been no apparent difference in the techniques of collection. It is hypothesized that the difference results from the time of collection and, more likely, from the fasting requested of the Agency 1 donors. The first clinical test of blood from donors who have fasted indicates this may be a factor in getting a somewhat more stable cell.

TABLE I-3.—VARIATION OF RED CELL STABILITIES AMONG COLLECTION SITES

| Collection site | Post-Thaw Recovery | Saline Resuspension Recovery |
|---|---|---|
| Agency 1 | 97.2 | 88.2 |
| Agency 2 | 96.1 | 84.5 |
| Agency 3 | 95.2 | 81.7 |

Pints (420-ml. blood plus 160-ml. ACD-PVP) were collected, frozen, and thawed under identical conditions.

PROCESS II

It is well established that both the composition of the suspending medium and the conditions of cooling and warming influence the injury and protection of red cells during freezing and thawing. Using artificial media of defined composition it is possible to study the effects of each and all constituents in which the red cells are suspended during processing. Moreover, the autologous plasma is available for subsequent resuspension of the thawed red cells. Their in vivo viability can be estimated under conditions equivalent to whole blood control specimens.

Using red cells suspended during freezing and thawing in defined media eliminates many restrictions on composition. Optimum chemical conditions can be readily sought for minimizing injury. The use of extracellular polymeric protective solutes allows rapid removal after thawing and immediate resuspension without osmotic problems inherent with small molecular weight solutes. Simple conventional centrifuging suffices to separate the red cells from their suspending medium and washing is not necessary.

Shell freezing is employed, this being accomplished by mechanical agitation at controlled frequencies in liquid nitrogen. Cooling rates are varied by varying the mixture volume and the use of appropriate heat transfer promoting coatings on the outside surfaces of the containers.

Thawing is accomplished by mechanical agitation (to promote convective heat transfer) in warm water. Conditions for particular experiments are described in footnotes to each table.

For experiments described in this section (i.e. Process II) whole blood-ACD was separated by centrifuging into the cellular and plasma fractions. The red cells were resuspended in polymer solutions and subjected to freezing and thawing. Best results occurred with final mixture concentrations of the polymeric protective additive of 10–20% w./v. Direct recoveries and resuspension recoveries of red cells were estimated as described above.

(A) CHEMICAL PARAMETERS

Polyvinylpyrrolidone K–30 (average M.W. 40,000) has been studied most extensively since preliminary small volume tests indicated its superiority over a variety of other polymers including dextran, gelatin, oxypolygelatin, low molecular weight (M.W. 10,000) polyvinylpyrrolidone and others, although these are nevertheless superior over other non-polymeric protective additives. Table II–1 shows the results of varying PVP concentration in a system containing red cells suspended in an equal volume of PVP in isotonic saline. Similar studies using K–15 (M.W. 10,000) PVP gave recoveries ranging from 69–95% over the same concentration range. Direct recoveries increased continuously with concentration, however, resuspension stability passed through a distinct optimum.

TABLE II-1.—EFFECT OF CONCENTRATIONS OF POLYVINYLPYRROLIDONE ON RED CELL RECOVERY

| PVP K–30 Conc., Percent | Direct Percent RBC Recovery | Percent Resuspension Recovery | | |
|---|---|---|---|---|
| | | Plasma | 6% Dextran | 5% Albumin |
| 10 | 79 | 56 | 83 | 49 |
| 20 | 94 | 90 | 94 | 84 |
| 30 | 96 | 95 | 97 | 93 |
| 40 | 98 | | | |
| 50 | 98 | 83 | 88 | 88 |
| 60 | 99 | 65 | 57 | 54 |

RBC in equal volume of suspending medium containing PVP K–30 at the concentrations shown in 0.15 M NaCl. Frozen in aluminum container using PVP-MeOH coating, 200 c.p.m. agitation. Thawed at 45°, 200 c.p.m. agitation.

Salt concentration influenced direct and resuspension recoveries. Both the absence of salt and its presence at 0.15 M were less favorable than an intermediate low concentration (Table II-2).

TABLE II-2.—EFFECT OF CONCENTRATIONS OF POLYVINYLPYRROLIDONE AND SALT ON RED CELL RECOVERY

Salt on Red Cell Recovery

| PVP K-30 Conc. in suspending medium, w./v. percent | Salt Conc. in suspending medium, w./v. percent | Direct Percent RBC Recovery | Resuspension Recovery, Percent | | |
|---|---|---|---|---|---|
| | | | Plasma | Wash | Plasma |
| 10 | 0 | 74 | 88 | 81 | 93 |
| 10 | 0.3 | 86 | 91 | 83 | 92 |
| 10 | 0.9 | 83 | 77 | 54 | 89 |
| 15 | 0 | 77 | 91 | 83 | 95 |
| 15 | 0.3 | 90 | 95 | 91 | 95 |
| 15 | 0.9 | 90 | 92 | 96 | 92 |

RBC suspended in equal volume of PVP K-30-salt solution and frozen in aluminum containers with PVP-Methanol coating in liquid nitrogen with mechanical agitation (2½ inch amplitude, 200 cycles/minute). Thawing was done under same agitation conditions in 45° C. water. Thawed cells were separated and suspended in autologous plasma; separate aliquot was washed with buffered saline containing 0.4% glucose and resuspended in plasma.

Polyvinylpyrrolidones of K-values ranging from about 12 to 30 were examined. Molecular weights above about 10,000 were required for optimum red cell recovery.

(B) PHYSICAL PARAMETERS

Optimum coating heat transfer conditions were obtained by coating the metal container with a solution of polyvinylpyrrolidone K-30 in methanol (500 centistokes viscosity).

Thawing by mechanical agitation in water at 55° improved in vitro direct and resuspension recoveries by several percent as compared with results obtained at 45° C.

Variation in mixture volume from 10 to 60% of container capacity indicated that red cell recovery was sensitive to volume only below about 30%. This could be ascribed to excessively rapid cooling or altered formation of the frozen shell during cooling.

Plastic containers were inferior to metal in terms of direct recovery. Resuspension stability was similar (Table II-3).

TABLE II-3.—COMPARISON OF METAL AND PLASTIC CONTAINERS FOR PROCESS II (PVP K-30 20%—0.05 M NaCl)

| Container | Direct Percent RBC Recovery | Resuspension Recovery, Percent | |
|---|---|---|---|
| | | Saline | PVP |
| Metal [a] | 97 | 87 | 92 |
| Plastic [b] | 91 | 87 | 91 |

[a] Aluminum container of rectangular cross-section 64 x 64 x 19 mm. Capacity 75 ml.
[b] Low density polyethylene bottles of rectangular cross-section 52 x 60 x 24 mm. Capacity 65 ml.
Each type container filled to 45% of capacity and frozen with mechanical agitation in liquid nitrogen and thawed in 45° C. water.

(C) PROCESS DEVELOPMENT

Table II-4 shows results obtained in eight experiments using 15% PVP-0.05 M NaCl as the medium. Table II-5 shows the variations in composition of the medium. Essentially equivalent results have been obtained in bottles and in plastic bags (Table II-6). The use of plastic packs allows considerable improvement in processing time since centrifugation can be done at high speed. Approximately 15-20 minutes are required to separate the thawed cells.

TABLE II-4.—PROCESSING OF PINT VOLUMES OF BLOOD BY PROCESS II

| Exp. No. | Percent Direct RBC Recovery | Percent Resuspension Recovery | |
|---|---|---|---|
| | | Dextran [a] | Plasma [a] |
| 1 | 92 | 96 | 94 |
| 2 | 88 | | 93 |
| 3 | 93 | 95 | 93 |
| 4 | 90 | 95 | 92 |
| 5 | 91 | 96 | 94 |
| 6 | 90 | 95 | 92 |
| 7 | 93 | 97 | 93 |
| 8 | 92 | 96 | 94 |

[a] Resuspension of RBC 1:2 in autologous plasma or 6% Dextran (Baxter Gentran M.W. 72,000 approximately).
RBC suspended in equal volume 15% K-30 PVP-0.05 M NaCl. Frozen in pint aluminum container (capacity 1,100 m.l approximately) with PVP-MeOH coating, 200 c.p.m. agitation. Thawed 25 seconds, 200 c.p.m., in 55° water.

TABLE II-5.—RED CELL RECOVERY DATA FOR 1 PINT PROCESS II TESTS

| Additive Composition | | | | Percent Intact Cells | | | |
|---|---|---|---|---|---|---|---|
| PVP (percent) | NaCl (M) | Glucose (percent) | Number of Tests | Thawed Blood | | Reconstituted Blood | |
| | | | | Direct RBC Recovery | Saline [a] EOP | Direct RBC Recovery | Saline [a] EOP |
| 20 | .05 | 0 | [b] 4 | 90 | 81 | 95 | 88 |
| 20 | .05 | 0 | 13 | 94 | 81 | 95 | 88 |
| 20 | .075 | 0 | 1 | 96 | 82 | 96 | 84 |
| 20 | .10 | 0 | 1 | 96 | 76 | 91 | 79 |
| 20 | .15 | 0 | 3 | 94 | 70 | 88 | 71 |
| 15 | .05 | 0 | 3 | 93 | 85 | 96 | 90 |
| 15 | .075 | 0 | 1 | 95 | 77 | 93 | 79 |
| 20 | .05 | 2 | 5 | 96 | 86 | 98 | 88 |

[a] Volume of blood diluted 100-fold with physiological saline then allowed to stand ½ hour prior to analysis for free hemoglobin.
[b] Thawing at 200 c.p.m. in 45° C. water bath. Other samples were agitated at 150-160 c.p.m.
Blood frozen: 300 cc. of additive per unit of packed cells from a pint collection.
Freezing Conditions: 200 c.p.m. in liquid nitrogen using corrugated aluminum 1 pint containers.

TABLE II-6.—EFFECT OF ANTICOAGULANT ON BLOOD PRESERVATION WITH PROCESS II

| Anticoagulant | [NaCl] in Additive (M) | Percent Intact Cells | | | |
|---|---|---|---|---|---|
| | | Thawed Blood | | Reconstituted Blood | |
| | | Direct RBC Recovery | Saline EOP | Direct RBC Recovery | Saline EOP |
| ACD-A | .05 | 92.9 | 75 | 89.6 | 82.5 |
| ACD-A | .1 | 94.9 | 75 | 89.9 | 79.3 |
| ACD-A | .1 | 95.0 | 79.8 | 90.6 | 85.0 |
| CPD | .1 | 93.9 | 74.5 | 87.7 | 78.7 |
| ACD-A | .1 | 93.1 | 75.8 | 89.7 | 80.2 |
| CPD | .1 | 92.9 | 72.6 | 86.3 | 76.7 |
| ACD-B | .05 | 94.2 | 81.9 | 95.7 | 90.9 |
| ACD-B | .05 | 94.1 | 80.6 | 95.5 | 90.4 |

Additive Solution: 20% Plasdone-C solution containing NaCl. 300 cc. added to each unit of packed cells.
Containers: No heat transfer-promoting coating.
Thawing Conditions: 150 c.p.m. agitation in 45° C. water bath.
Reconstitution: Remove supernatant from packed cells after thawing and resuspend in autologous plasma.
Saline EOP: Dilute blood 100-fold with physiological saline and analyze for free hemoglobin after ½ hour standing at room temperature.

Clinical studies of Process II have served a severalfold purpose. Most important, a high in vivo viability of human red cells subjected to rapid freezing and thawing while protected by a polymeric solute is unequivocally demonstrated.

Results of transfusions of half pint volumes of blood frozen by Process II are shown in Table II-7. Similar results for full pints are shown in Table II-8.

TABLE II-7.—SUMMARY OF HALF-PINT RESULTS

| Conditions | No. Items | Percent Recovery | | Percent Survival [b] | | | |
|---|---|---|---|---|---|---|---|
| | | Direct | Resp.[a] | ½ hr. | 24 hr. | 48 hr. | 72 hr. |
| Frozen Proc. II, 15% PVP-LS [c] | 8 | 88±2 | 94±1 | 98±13 | 86±13 | 79±12 | 74±11 |
| Frozen Proc. II, 20% PVP-LS [c] | 8 | 88±2 | 90±2 | 87±9 | 73±8 | 67±11 | 68±8 |
| Frozen Proc. II, 20% PVP-NS [c] | 7 | 88±4 | 88±3 | 85±8 | 75±9 | 73±7 | 71±9 |
| Frozen Proc. III [d] | 3 | 89 | 90 | 89 | 79 | 73 | 73 |
| Controls, unfrozen fresh | 17 | | | 103±7 | 97±8 | 92±8 | 90±9 |
| Controls, 4-day, 4° C. storage | 3 | | | 105 | 103 | 98 | 97 |

[a] Resuspension recovery=percent recovery following resuspension of thawed cells in plasma.
[b] Survival by consecutive Chromium-51 procedure; percent of transfused RBC.
[c] Equal volumes RBC's and additive solution: LS=0.05 M NaCl; NS=0.15 M NaCl
[d] Process III=equal parts plasma and 30% PVP; approximately 2 vol. plasma-PVP medium used for each volume RBC.
Standard deviations shown as ±values after each average value.

TABLE II-8.—RED CELL SURVIVAL FOLLOWING TRANSFUSION OF FULL PINTS OF BLOOD FROZEN BY PROCESS II

| Transf. No. | Volume Transfused (ml.) | Direct RBC Recovery, percent | Resuspension Recovery, percent | Percent RBC Survival | | | |
|---|---|---|---|---|---|---|---|
| | | | | 30 min. | 24 hr. | 48 hr. | 72 hr. |
| A. 15% PVP-LS: | | | | | | | |
| 1 | 456 | 91 | 84 | 72 | 66 | 62 | 50 |
| 2 | 493 | 88 | 80 | 67 | 50 | 53 | 39 |
| 3 | 505 | 92 | 91 | 55 | 51 | 49 | 36 |
| 4 | 451 | 93 | 91 | 60 | 48 | 55 | 39 |
| Avg. ± S.D. | | 91±2 | 86±5 | 63±8 | 54±8 | 55±5 | 41±6 |
| Control A1 | 522 | | | 103 | 97 | 98 | 82 |
| Control A2 | 518 | | | 106 | 100 | 101 | 93 |
| Avg | | | | 104.5 | 98.5 | 99.5 | 87.5 |
| B. 20% PVP-NS: | | | | | | | |
| 5 | 343 | 96 | 94 | 74 | 71 | 61 | 62 |
| 6 | 300 | 96 | 93 | 78 | 70 | 71 | 69 |
| 7 | 284 | 96 | 96 | 85 | 64 | 66 | 65 |
| Avg. ± S.D. | | 96±0 | 94±2 | 79±6 | 68±4 | 66±5 | 65±4 |
| C. 20% PVP-LS: | | | | | | | |
| 8 | 451 | 95 | 95 | 94 | 82 | 76 | 76 |
| 9 | 460 | 95 | 95 | 94 | 73 | 82 | 72 |
| 10 | 485 | 95 | 96 | 84 | 73 | 68 | 71 |
| 11 | 371 | 94 | 94 | 87 | 76 | 72 | 74 |
| 12 | 378 | 94 | 94 | 95 | 88 | 81 | 82 |
| 13 | | 95 | 96 | | | | |
| Avg. ± S.D. | | 95 | 95±1 | 91±5 | 78±7 | 76±6 | 75±4 |
| Control C1 | 501 | | | 106 | 103 | 99 | 98 |
| Control C2 | 508 | | | 76 | 76 | 72 | 74 |
| Avg | | | | 91 | 89 | 75 | 86 |

TABLE II-8—Continued

| Transf. No. | Volume Transfused (ml.) | Direct RBC Recovery, percent | Resuspension Recovery, percent | Percent RBC Survival | | | |
|---|---|---|---|---|---|---|---|
| | | | | 30 min. | 24 hr. | 48 hr. | 72 hr. |
| D. 20% PVP-LS: | | | | | | | |
| 14 | 470 | 96 | 94 | 77 | 71 | 62 | 60 |
| 15 | 443 | 97 | 97 | 81 | 62 | 58 | 50 |
| 16 | 436 | 95 | 92 | 70 | 64 | 58 | 58 |
| 17 | 437 | 95 | 91 | 69 | 58 | 52 | 51 |
| Avg. ± S.D. | | 96±1 | 94±3 | 74±6 | 64±5 | 57±4 | 55±5 |
| Control D1 | 544 | | | 110 | 94 | 82 | 74 |
| Control D2 | 514 | | | 94 | 82 | 76 | 71 |
| Avg | | | | 102 | 88 | 79 | 72 |

Equal volumes of red blood cells combined with additive solutions indicated, and frozen in 1,100-ml. capacity container. Thawed by agitation in 45° C. water bath. Thawed cells resuspended in autologous plasma.
Controls: Untreated autologous blood infused not more than 24 hours after withdrawal.
LS: 0.05 M NaCl. NS: 0.15 M NaCl.

(D) PVP-HUMAN SERUM ALBUMIN

The presence of insoluble β-lipoprotein in suspensions of cells containing plasma and PVP led to test of cell suspensions containing less, or no, plasma. Blood was centrifuged to pack the red cells and the supernatant plasma removed. Red cells were then suspended in a medium containing PVP and albumin. Because we had observed, when testing serum albumin as a protective material, that it increased the protective action of PVP when red cells were processed in a solution containing both, we have concentrated on this mixture.

Processing involves separation of red cells from plasma, washing by resuspension of the cells in isotonic saline when the plasma is to be substantially completely removed; separation of the red cells from wash solution and resuspension in a solution containing PVP and albumin.

(a) Description of Process

Blood (450 ml.) is collected into 72 to 75 ml. of ACD-A and then centrifuged. After separation of the plasma from the cells, the cells are resuspended in an equal volume of additive containing 14% Plasdone C, 3% human serum albumin, and 0.6% sodium chloride. The suspension is frozen in the same way as whole blood plus PVP.

(a) In Vitro Stability

Using the same criteria of stability as those described in the section on Whole Blood Plus PVP it was found that red cells suspended in an equal volume of a medium containing 11% PVP and 2.5% serum albumin were of good stability and that these concentrations in the medium were the minimum that resulted in maximum stability of frozen and thawed cells. With them it was possible to get 97% recovery of intact cells after thawing and 90% recovery of cells on resuspension 1/40 in isotonic saline.

(c) In Vivo Stability

Assay of survival of cells following infusion showed the cells to be more stable than those recovered from the whole blood plus PVP. The loss of cells 24 hr. after transfusion was only 12%, in contrast to the 20% loss of cells from the whole blood plus PVP (Table II-9). This compares favorably with the survival (93 to 95%) of fresh cells that have not been frozen and thawed.

TABLE II-9.—PVP-ALBUMIN PROCESS

| Amount Processed | Trials | Recovery | Survival | | | |
|---|---|---|---|---|---|---|
| | | | 30 Min. | 24 Hr. | 48 Hr. | 72 Hr. |
| ½ pint | 47 | 97.1±0.3 | 87±6 | 88±7 | 82±7 | 78±7 |
| Pint | 5 | 97.3±0.3 | | 89±5 | 85±5 | 78±7 |

Blood collected into ACD-A. Cells separated and resuspended in 14% PVP, 3% albumin and 0.6% NaCl. Thawed cells separated from PVP solution and resuspended in autologous plasma for transfusion.

(d) Processing Conditions

The same freezing and thawing conditions are used for this preparation as for whole blood-PVP after red cells are resuspended in PVP–albumin.

PROCESS III

In attempts to improve the red cell recovery for Process II the ratio of red cells to PVP suspending medium was varied. Included among the samples studied were some in which red cells were suspended in a medium composed of plasma and polyvinylpyrrolidone solution. As shown in Table III-1 improvement in red cell direct and resuspension recoveries resulted when plasma was present.

When the amount of plasma was varied from 0 to 70% of the medium (by volume) at constant PVP concentration (15%), direct red cell recovery was observed to vary only slightly, while a marked improvement in saline and PVP (isotonic-isooncotic resuspension stability resulted (Table III-2). Above a level of 50% plasma, no improvement was found.

These observations suggested a process in which only a part of the plasma would be removed from whole blood prior to combining with an extracellular protective additive solution. This method has been designated Process III.

(A) CHEMICAL PARAMETERS

An optimum concentration of PVP (K–30) in the suspending medium between 15 and 30% was found for Process III when 50% plasma was present (Table III-3) (final mixture concentration 10–20% w./v.). Using either K–30 (average M.W. 40,000) or K–22 (average M.W. 25,000) polyvinylpyrrolidone at a concentration (w./v.) in the suspending medium of 20% essentially equivalent recoveries and resuspension stabilities were obtained over the range of plasma concentrations 15 to 60% w./v. in the suspending medium.

TABLE III-1.—EFFECT OF VARYING THE COMPOSITION OF MEDIUM FOR PROCESS II

| Vol. RBCS | Vol. Plasma | Vol. PVP Soln. | Conc. Percent PVP Stock [1] | Percent RBC Recovery | Percent Resuspension Recovery | |
|---|---|---|---|---|---|---|
| | | | | | Saline | PVP |
| 1 | 0 | 0.5 | 15 | 94 | 87 | 94 |
| 1 | 0 | 1.0 | 15 | 93 | 89 | 95 |
| 1 | 0 | 2.0 | 15 | 90 | 85 | 93 |
| 1 | 0.5 | 0.5 | 30 | 97 | 90 | 97 |
| 1 | 1.0 | 1.0 | 30 | 97 | 92 | 95 |

[1] K-30 PVP in 0.05 M NaCl.
53 ml. of RBC-PVP or RBC-Plasma-PVP mixture frozen in aluminum containers coated with PVP-MeOH by agitation at 200 c.p.m. 2½ inch amplitude in liquid nitrogen and thawed at 200 c.p.m. in 45° water.

TABLE III-2

| Percent Plasma in Suspending Medium | Direct RBC Recovery | Percent Resuspension Stability Saline |
|---|---|---|
| 0 | 94 | 70 |
| 25 | 95 | 80 |
| 50 | 96 | 84 |
| 60 | 97 | 85 |
| 70 | 96 | 85 |

RBC in equal volume PVP K–30 in 0.15 M NaCl. Frozen in aluminum container using PVP-MeOH coating, 200 c.p.m. agitation. Thawed at 45°, 200 c.p.m. agitation.

TABLE III-3.—EFFECT OF POLYVINYLPYRROLIDONE CONCENTRATION IN PROCESS II

| K-30 PVP Conc. in the suspending medium, w./v. Percent | Direct Percent RBC Recovery | Resuspension Recovery, Percent | |
|---|---|---|---|
| | | Saline | PVP |
| 10 | 93±0 | 89±0 | 91±1 |
| 15 | 94±1 | 94±1 | 95±0 |
| 20 | 95±0 | 94±0 | 95±0 |
| 30 | 96±1 | 90±1 | 94±0 |

RBC/Medium=1:2. Medium: 50% Plasma-PVP-0.1 M NaCl.

Varying the ratio of red cells to suspending medium improved direct red cell recoveries and resuspension recoveries. The presence of 1 to 2 volumes of medium (50% plasma—15% PVP) per volume of red cells gave recoveries significantly better than lesser volumes (Table III–4). Larger volumes of suspending medium were equivalent but did not improve recoveries.

TABLE III-4.—EFFECT OF VOLUME RATIO BETWEEN RED CELLS AND MEDIUM (PROCESS III)

| Vol. Medium Per Vol. RBC | Direct Percent RBC Recovery | Percent Resuspension Recovery | | |
|---|---|---|---|---|
| | | Dextran a | Saline b | PVP b |
| 0.25 | 94 | 95 | 86 | 93 |
| 0.5 | 95 | 96 | 88 | 93 |
| 1.0 | 94 | 97 | 94 | 96 |
| 2.0 | 95 | 98 | 94 | 97 | a Dilution 1:2.
b Dilution 1:100.

RBC separated from whole blood washed with plasma-PVP, and resuspended in volumes of medium shown per volume cells. Frozen in aluminum container with PVP-Methanol coating with mechanical agitation 200 c.p.m. Thawed at 45° C. and 150 c.p.m.

Plasma, polyvinylpyrrolidone, and salt concentrations were studied simultaneously to define an optimum composition and delineate the useful limits of this system. Representative results are shown in Table III–5. An optimum in PVP final mixture concentration of about 13% w./v. exists. Plasma concentration can be as low as 15–30% of the medium by volume. Salt appears to be injurious at 0.15 M but at lower concentrations can be varied considerably without affecting red cell recovery.

TABLE III-5.—EFFECTS OF COMPOSITIONS OF THE MEDIUM ON RED CELL RECOVERY OBTAINED BY PROCESS III

| Percent Plasma a | Percent PVP b | Concentration of Salt in Additive c | | |
|---|---|---|---|---|
| | | 0.0 M | 0.05 M | 0.15 M |
| 15 | 10 | 90 (78) | 93 (80) | 92 (60) |
| 15 | 20 | 96 (88) | 96 (86) | 97 (79) |
| 15 | 30 | 97 (83) | 96 (57) | 97 (66) |
| 30 | 10 | 94 (88) | 97 (88) | 93 (65) |
| 30 | 20 | 97 (88) | 97 (87) | 97 (81) |
| 30 | 30 | 98 (80) | 97 (64) | 97 (70) |
| 60 | 20 | 95 (81) | 94 (84) | 94 (71) |
| 60 | 20 | 98 (90) | 95 (84) | 97 (83) | a Vol. percent plasma in medium.
b W./v. percent K-22 PVP in medium.
c NaCl conc. (molar) in PVP soln. added—Does not include salt from plasma. (See Text).

Values are percent direct RBC recovery; values in parentheses are percent resuspension recoveries in isotonic saline (1:100). All samples consisted of RBC (1 vol.)+medium (2 vol.). Frozen in uncoated aluminum containers in liquid nitrogen at 200 c.p.m. and thawed in 45° water at 150 c.p.m.

Albumin at a final mixture concentration of 3–5% was observed to effectively substitute for plasma. The complete absence of salt led to reduced red cell recovery. However concentrations of only 0.02 M or above appeared sufficient.

(B) PHYSICAL PARAMETERS

Excessively rapid agitation, especially during thawing, reduced red cell direct and resuspension recoveries (Table III–6). Using mechanical agitation at an amplitude of 2½ inches, an optimum frequency of approximately 200 cycles/minute was observed. Thawing can be carried out at low frequencies of agitation and even manual shaking (approximately 75–100 cycles/minute) is adequate (Table III–7). Variation in mixture volume, from 10–60% of container capacity indicated that red cell recovery is sensitive to volume only below about 30%.

TABLE III-6.—EFFECT OF CONDITIONS OF AGITATION DURING COOLING AND WARMING ON PROCESS III

| Frequency of Agitation Cycles/Min. (Thawing) | Frequency of Agitation, Cycles/Min. (Cooling) | | |
|---|---|---|---|
| | 150 | 225 | 300 |
| 150 | 94 (83) | -------- | 88 (89) |
| 175 | -------- | 93 (87) | -------- |
| 225 | 91 (86) | -------- | 83 (90) |
| 275 | -------- | 84 (90) | -------- |
| 300 | 74 (89) | -------- | 70 (90) |

Values are percent Direct RBC Recovery.
Values in parentheses are percent Resuspension Recovery in Saline.
RBC in equal volume of 50% plasma—15% K-30 PVP-0.1 M NaCl. Frozen in aluminum containers with PVP-MeOH coating, variable agitation, in liquid N². Thawed in 45° C. water, variable agitation.

TABLE III-7.—EFFECT OF AGITATION CONDITIONS DURING THAWING ON PROCESS III

| Agitation Frequency Cycles/Min. (Thawing) | Direct RBC Recovery | Percent Resuspension Recovery | |
|---|---|---|---|
| | | Saline | PVP |
| Manual (75–100) | 96 | 88 | 94 |
| Mech. 50–80 | 96 | 85 | 92 |
| Mech. 60–95 | 95 | 87 | 93 |
| Mech. 90–110 | 96 | 88 | 94 |

RBC in equal volume of 50% w./v. plasma–15% w./v. K-30 PVP-0.1 M NaCl. Frozen in aluminum containers with PVP-MeOH coating 200 c.p.m. agitation, in liquid nitrogen. Thawed in 45° C. water.

Red cell recoveries decline when thawing is carried out in water at temperatures below 30° C. Equivalent recoveries were obtained when thawings were done in water at 30 to 45° C. (Table III–8).

TABLE III-8.—EFFECT OF TEMPERATURES OF THAWING ON PROCESS III RECOVERY

| Thaw Bath Temperature, ° C. | Direct Percent RBC Recovery | Percent Recovery in Dextran |
|---|---|---|
| 20 | 91 | 96 |
| 25 | 92 | 96 |
| 30 | 94 | 97 |
| 35 | 95 | 97 |
| 40 | 95 | 98 |
| 45 | 95 | 97 |

RBC/Medium=1:1; Medium: 50% plasma–15% PVP-0.1 M NaCl.

Although more sensitive to such factors as low concentrations of plasma or polyvinylpyrrolidone, samples frozen and thawed in polyethylene containers gave in vitro recoveries equivalent to those obtained in aluminum containers of approximately equal geometries (Table III–9).

TABLE III-9.—COMPARISON OF METAL AND PLASTIC CONTAINERS FOR PROCESS III

| Container | Direct Percent RBC Recovery | Resuspension Recovery Percent | |
|---|---|---|---|
| | | Saline | PVP |
| Metal | 98 | 92 | 95 |
| Plastic | 96 | 94 | 97 |

See footnote, Table II-3.

(C) PROCESS DEVELOPMENT

From the standpoint of civilian or military medicine under conditions where separation and resuspension of red cells before transfusion would not pose a serious limitation, Process III affords a useful means of preservation when polymers are used as protective additives.

Table III-10 shows results obtained in processing full units of blood. The high dilution systems involved adding PVP to whole blood without removal of plasma. Volumes up to almost 85% of container capacity (up to 950 ml.) have been frozen and thawed with no reduction in recovery of red cells.

TABLE III-10.—PROCESSING OF PINT VOLUMES OF BLOOD

| Exp. No. | Dilution RBC/Total Vol. | Percent Direct RBC Recovery | Percent Resuspension Recovery | | |
|---|---|---|---|---|---|
| | | | Dextran [a] | Saline [b] | PVP [b] |
| 1 | 1:2.6 | 95 | [c](94) | 86 | 93 |
| 2 | 1:2.6 | 95 | 96 | | |
| 3 | 1:2.6 | 96 | 96 | 83 | 86 |
| 4 | 1:2.5 | [d]94 | 95 | 87 | 93 |
| 5 | 1:2.5 | 97 | 98 | 86 | 91 |
| 6 | 1:4.1 | 96 | 98 | 88 | 91 |
| 7 | 1:4.7 | 96 | 98 | | |

[a] Resuspended RBC 1:2.
[b] Resuspended RBC 1:100.
[c] Resuspension 1:2 in 5% albumin-saline.
[d] Incompletely thawed in 45 seconds.
RBC suspended in 50% w./v. plasma-15% w./v. K-30 PVP-0.1 M NaCl in ratios shown. Ratios of 1:2.5–2.6 were systems with ½ plasma removed followed by reconstitution to volume with PVP solution. Ratios of 1:4.1–4.7 were systems with PVP solution added directly to whole blood giving volumes of 800–900 ml. at time of freezing. All frozen in PVP-MeOH coated pint aluminum containers (capacity 1100 ml. approximately) at 200 c.p.m. agitation in liquid nitrogen approximately 90 seconds. Thawing in 45° water, 150 c.p.m., 45–50 seconds.

Process III has been studied clinically in a series of small volume (10 ml.) transfusions reported in Tables III–12 through III–17. Immediate (10–30 minutes) and 24 hour survival for 10 untreated control samples and 5 samples processed without freezing and thawing are shown in Table III–11. Precision has been approximately ±4% in all cases. Accuracy appears to be very high as evidenced by control cell survival of 99±4% immediately following infusion as compared with the theoretical level of 100%.

For Process III, optimum conditions in terms of red cell survival appear to require metal containers for freezing. Thawing at 37° C. was better by several percent than thawing at 25° or 45°. Polyvinylpyrrolidone final mixture concentration between 10–15% w./v., plasma concentration between 15 and 50%, and salt concentration between 0.055 and 0.10 molar afford essentially equivalent preparations on the basis of in vivo red cell survival. Dilution and heat transfer conditions studied appeared to affect slightly immediate post-infusion survival, but not 24-hour survival.

TABLE III-11.—CONTROL STUDIES OF RED CELL SURVIVAL

| Conditions | No. Tests | Percent RBC Recovery | | Percent RBC Survival | |
|---|---|---|---|---|---|
| | | Direct | Resusp. | 10–30 min. | 24 hr. |
| Untreated Blood [a] | 10 | | | 99±4 | 91±4 |
| Prefreeze Handling [b] | 5 | 99 | 100 | 105±3 | 97±3 |

[a] Autologous blood, collected by venipuncture, labeled with Cr51 (½ hr.) and reinfused.
[b] Processed according to Process III (in 50% Plasma-15% PVP-0.1 M NaCl including all transfers, shaking (200 c.p.m.), resuspension in dextran, etc., but without freezing and thawing.

TABLE III-12.—EFFECT OF THAWING BATH TEMPERATURE ON RED CELL VIABILITY (PROCESS III)

| Thaw Bath Temp.,° C. | No. Tests | Percent RBC Recovery | | Percent RBC Survival | |
|---|---|---|---|---|---|
| | | Direct | Resusp. | 10–30 Min. | 24 Hrs. |
| 45 | 3 | 96±0 | 97±1 | 88±6 | 71±5 |
| 37 | 6 | 94±2 | 97±1 | 93±6 | 78±5 |
| 25 | 3 | 86±6 | 96±1 | 87±1 | 69±3 |

System: RBC in suspending medium containing 50% w./v. plasma-15% w./v. PVP-0.1 M NaCl.
Dilution: RBC/Total volume=1/2.6.
Conditions: 50 ml. in aluminum container coated with PVP-MeOH. Mech. agitation in liquid N₂ 200 cycles/min. (c.p.m.) 2½ in. amplitude. Thawed at 25–45° C., 150 c.p.m.
All values are average ±1σ. Resuspensions in 6% Dextran.

TABLE III-13.—EFFECTS OF HEAT TRANSFER COATING AND TYPE OF CONTAINER ON RED CELL VIABILITY (PROCESS III)

| Container | Cross Section, mm. | Heat Transf. Coating | No. Tests | Percent RBC Recovery | | Percent RBC Survival | |
|---|---|---|---|---|---|---|---|
| | | | | Direct | Resusp. | 10–30 Min. | 24 Hr. |
| Metal | 19 | PVP-Methanol | 2 | 96±2 | 96±1 | 93±3 | 74±3 |
| Do | 19 | None | 2 | 97±1 | 98±0 | 84±2 | 72±1 |
| Plastic | 25 | do | 3 | 96±1 | 98±1 | 78±5 | 59±6 |

System: RBC in suspending medium containing 50% w./v. Plasma-20% w./v. K-30 PVP-0.075 M NaCl.
Dilution: RBC/Total vol.=1/2.6.
Conditions: Cooling in liquid N₂ 200 cycles/min., 2½ in. ampl. Warming 37° C. water, 150 cycles/min. 2½ in. ampl.
All values are averages ±1σ. Resuspensions in 6% Dextran.

TABLE III-14.—Effect of Dilution

| Dilution Factor RBC/Total | No. Tests. | Percent RBC Recovery | | Percent RBC Survival | |
|---|---|---|---|---|---|
| | | Direct | Resusp. | 10-30 Min. | 24 Hrs. |
| 1/2.5-2.8 | 3 | 94±0 | 97±1 | 88±6 | 71±5 |
| 1/4.5-4.7 | 3 | 96±0 | 96±1 | 92±3 | 74±3 |

System: RBC in suspending medium containing 50% w./v. Plasma-15% w./v. PVP-0.1 M NaCl.
Conditions: 45-90 ml. in aluminum containers with PVP-MeOH coating. Mech. agitation in liquid $N_2$ 200 c.p.m., 2½ in. ampl. Thawed in 45° C. water at 150 c.p.m., 2½ in. ampl.
All values are averages ±1σ. Resuspensions in 6% Dextran.

TABLE III-15.—EFFECT OF PLASMA CONCENTRATION ON RED CELL VIABILITY (PROCESS III)

| Suspending Medium Composition | No. Tests | Percent RBC Recovery | | Percent RBC Survival | |
|---|---|---|---|---|---|
| | | Direct | Resusp. | 10-30 Min. | 24 Hr. |
| 50% Plasma-20% PVP-0.075 M NaCl | 2 | 96±2 | 96±1 | 93±3 | 74±3 |
| 30% Plasma-20% PVP-0.075 M NaCl | 2 | 95±3 | 98±1 | 90±4 | 76±1 |
| 15% Plasma-20% PVP-0.075 M NaCl | 3 | 95±1 | 97±1 | 88±1 | 78±4 |

Dilution: RBC/Total volume=1/2.6.
Condition: 50 ml. in aluminum containers coated with PVP-MeOH. Mech. agitation in liquid $N_2$, 200 c.p.m., 2½ in. ampl. Thawed in 37° C. water, 150 c.p.m.
All values are averages ±1σ. Resuspensions in 6% Dextran.

TABLE III-16.—EFFECTS OF CONCENTRATION OF POLYVINYLPYRROLIDONE ON RED CELL VIABILITY (PROCESS III)

| Suspending Medium Composition | No. Tests | Percent RBC Recovery | | Percent RBC Survival | |
|---|---|---|---|---|---|
| | | Direct | Resusp. | 10-30 Min. | 24 Hr. |
| 30% Plasma-10% PVP-0.06 M NaCl | 1 | 88 | 91 | 76 | 62 |
| 30% Plasma-15% PVP-0.06 M NaCl | 1 | 88 | 94 | 74 | 77 |
| 30% Plasma-20% PVP-0.06 M NaCl | 1 | 92 | 95 | 86 | 76 |
| 30% Plasma-25% PVP-0.06 M NaCl | 1 | 96 | 95 | 92 | 78 |
| 30% Plasma-30% PVP-0.06 M NaCl | 1 | 97 | 93 | 81 | 72 |

Dilution: RBC/Total Volume=1/2.6.
Conditions: 50 ml. in aluminum containers coated with PVP-MeOH. Mech. agitation in liquid $N_2$, 200 c.p.m., 2½ in. ampl. Thawed in 37° C. water, 150 c.p.m.
All values in this table are single transfusions. Resuspensions in 6% Dextran.

TABLE III-17.—EFFECT OF SALT CONCENTRATION ON RED CELL VIABILITY (PROCESS III)

| Suspending Medium Composition | No. Tests | Percent RBC Recovery | | Percent RBC Survival | |
|---|---|---|---|---|---|
| | | Direct | Resusp. | 10-30 Min. | 24 Hr. |
| 30% Plasma-20% PVP-0.055 M NaCl | 1 | 92 | 97 | 93 | 77 |
| 30% Plasma-20% PVP-0.06 M NaCl | 1 | 92 | 95 | 86 | 76 |
| 30% Plasma-20% PVP-0.075 M NaCl | 1 | 93 | 98 | 92 | 76 |
| 30% Plasma-20% PVP-0.085 M NaCl | 1 | 97 | 97 | 87 | 75 |

Dilution: RBC/Total Volume=1/2.6.
Conditions: 50 ml. in aluminum containers coated with PVP-MeOH. Mechanical agitation in liquid $N_2$, 200 c.p.m., 2½ in. ampl. Thawed in 37° C. water, 150 c.p.m.
All values in this table are single transfusions. Resuspensions in 6% Dextran.

MODIFIED PROCESS III

An approach providing a process requiring a minimum of post-thaw handling, yet allowing the use of higher concentrations of additive during freezing and thawing than would be acceptable for direct transfusion, was sought in a reduced volume system. If red cells are frozen in a small volume of concentrated medium, post-thaw dilution, without separation of the cells, could suffice simultaneously to reduce the additive concentration to physiologic levels and the hematocrit to a normal range. Systems employing this principle have been studied, using polyvinylpyrrolidone or human serum albumin.

(A) PROTECTION BASED ON POLYVINYLPYRROLIDONE

When whole blood is collected into, or combined with, 30% K-30 polyvinylpyrrolidone in 0.05 M NaCl equal in volume to the volume of plasma, freezing can be carried out with recovery of 97-98% of the red cells. If, prior to freezing the blood-PVP mixture is centrifuged and plasma-PVP removed leading ¼ volume relative to the red cell volume, freezing and thawing can be carried out with recovery of 95-96% of the red cells. Dilution after freezing and thawing of 5 volumes of the concentrated (reduced volume) mixture with isotonic saline to 8 volumes reduces the hermatocrit to about 45% and the PVP concentration in the medium to about 3¾% (excluding trapped PVP in the red cell mass). After dilution the recovery of red cells is 90-93%.

(1) *Chemical Parameters*

Under reduced volume conditions the optimum final mixture concentration of PVP K-30 was observed to be about 3-4% (Table III-18). PVP's of K-values of 22 or greater (M.W.'s 25,000-40,000) were essentially equiva- TABLE III-18.—EFFECT OF POLYVINYLPYRROLIDONE CONCENTRATION IN REDUCED VOLUME SYSTEM

| PVP Conc. Percent in Medium | Direct Percent RBC Recovery | Percent Resuspension Recovery | |
|---|---|---|---|
| | | Saline | PVP |
| 12.5 | 95 | 81 | 90 |
| 15.0 | 96±1 | 87±0 | 93±0 |
| 17.5 | 96±1 | 87±2 | 94±1 |
| 20.0 | 94 | 84 | 93 |

RBC suspended in ¼ volume of medium containing 50% w./v. plasma-PVP-0.1 M NaCl. Frozen in aluminum containers with PVP-MeOH coating, 200 c.p.m. agitation, in liquid $N_2$. Thawed at 150 c.p.m. in 45° C. water.

The degree of post-thaw dilution markedly affects red cell recovery as shown in Table III-19. Variation in recovery after dilution was observed unless dilution was carefully controlled.

TABLE III-19.—EFFECT OF POST THAW DILUTION ON RECOVERY OBTAINED IN REDUCED VOLUME POLYVINYLPYRROLIDONE SYSTEM

| Dilution Factor a | Final Conc. PVP in Medium Percent (w./v.) | Percent RBC Recovery |
|---|---|---|
| 1.0 | 20.7 | 97 |
| 1.2 | 10.3 | 95 |
| 1.6 | 5.2 | 94 |
| 2.0 | 4.1 | 90 |
| 4 | 1.4 | 82 |
| 10 | 0.4 | 77 | a Ratio of thawed blood-PVP mixture to total diluted volume. RBC's processed and diluted with isotonic saline after thawing. K-30 PVP used at 20.7% conc. in medium.

Post-thaw stability is shown in Table III-20. Two to four percent loss per day occurred at 4° C.

TABLE III-20.—POST THAW STABILITY OF RED CELLS IN REDUCED VOLUME SYSTEM

| Conditions | Percent RBC Recovery | | | | |
|---|---|---|---|---|---|
| | Time of Storage (Hours) | | | | |
| | 0 | 24 | 48 | 72 | 96 |
| Stored Undiluted at 4° C | 96 | 96 | | | |
| Stored Diluted 5:8 at 4° C | 93 | 92 | | | |
| Stored Undiluted at 4° C., but Diluted before Analysis | 93 | 89 | 87 | | 84 |

Samples consisted of RBC frozen in ¼ volume 50% Plasma-15% PVP-0.1 M NaCl and stored as shown.

(2) Physical parameters

Optimum cooling conditions were obtained using uncoated and PVP-methanol coated metal containers. Slower or more rapid heat transfer conditions resulted in markedly reduced recoveries.

Metal containers gave superior recoveries when compared to polyethylene containers (Table III-21)

TABLE III-21.—COMPARISON OF METAL AND PLASTIC CONTAINERS

| Container | Direct Percent RBC Recovery | Percent Resuspension Recovery | |
|---|---|---|---|
| | | Saline | PVP |
| Metal | *97 (96) | 86 | 92 |
| Plastic | *93 (93) | 87 | 93 |

*Values in parentheses are after normalizing hematocrit and reducing PVP conc. by dilution 5:8 with saline.
See footnotes Table II-3.

Thawing was carried out at temperatures of 37°, 45°, and 55° with essentially equivalent results. Optimum conditions of agitation were observed at about 200 cycles/minute for cooling and 50–15-cycles/minute for thawing. Thawing has been carried out manually (75–100 c.p.m. approximately) with recoveries as high as those obtained with mechanical agitation.

(3) Process development

Tables III-22 and III-23 show results obtained on freezing pint units of blood by the modified Process III.

TABLE III-22.—PROCESSING OF PINT VOLUMES OF BLOOD BY PROCESS III (REDUCED VOLUME PVP SYSTEM)

| Exp. No. | Percent Direct RBC Recovery | Percent RBC Recovery After Dilution | Percent Resuspension Recovery | |
|---|---|---|---|---|
| | | | Saline | PVP |
| 1 | 92 | 88 | 71 | 78 |
| 2 | 95 | 90 | 84 | 91 |

Full pints (500–600 ml.) of whole blood combined with 30% K-30 PVP-0.05 M NaCl to give RBC suspended in medium of composition: 50% plasma-15% PVP 0.1 M NaCl. The mixture was centrifuged and PVP-plasma removed by aspiration to leave ¼ vol. medium per vol. RBC's. This mixture was frozen in PVP-MeOH coated aluminum containers (capacity: 450 ml. approximately) with agitation at 200 c.p.m. in liquid nitrogen. Thawing in water at 45° C. at 150 c.p.m. Dilution 5:8 with isotonic saline after thaw. (Sample withdrawn for direct recovery before saline addition).

TABLE III-23.—PROCESSING OF PINT VOLUMES OF BLOOD BY PROCESS III (PVP SYSTEM)

| Exp. No. | Percent RBC Recovery | Percent RBC Recovery After Dilution | Percent Saline Resuspension Recovery |
|---|---|---|---|
| 1 | 95 | 87 | 77 |

A pint (580 cc.) of blood drawn into ACD-B was centrifuged and 240 cc. of plasma removed. To the packed cells was added 40 cc. of 30% Plasdone-C in 0.05 M NaCl and the mixture frozen in an uncoated aluminum container with 200 c.p.m. agitation. After thawing in a 45° C. water bath at 160 c.p.m., it was diluted with 230 cc. of physiological saline. (Sample withdrawn for direct recovery prior to saline addition).

(4) Process III: Reduced volume system

Small volume studies of the survival of red cells frozen in reduced volume systems with K-30 and K-22 PVP and with human serum albumin are shown in Table III-24.

TABLE III-24.—RED CELL RECOVERY AND SURVIVAL FOR PROCESS III (REDUCED VOLUME SYSTEM)

| Conditions | Thaw Temp., °C. | No. Tests | Percent RBC Recovery After Dilution | Percent RBC Survival | |
|---|---|---|---|---|---|
| | | | | 10-30 min. | 24 hr. |
| Proc. (Plasma-K-30 PVP) a | 45 | 4 | 88±3 | 88±3 | 73±3 |
| Proc. (Plasma-K-30 PVP) a | 37 | 2 | 90±0 | 86±4 | 68±6 |
| Proc. (Plasma-K-22 PVP) b | 37 | 3 | 94±2 | 83±4 | 71±3 |
| Proc. (Albumin System) c | 45 | 2 | 92±0 | 74±5 | 74±4 | a Whole blood mixed with 30% K-30 PVP-0.05 M NaCl equal to plasma volume, centrifuged, and supernatant removed leaving a volume of suspending medium equal to ¼ the cell volume. Frozen as for Process III. Thawing done with agitation at 45° C. or manually at 37° C. Samples diluted with isotonic NaCl (3 vol. saline per 5 vol. concentrated RBC-additive mixture).
b Same as (a) except that 30% K-22 PVP-0.05 M NaCl was used.
c Cell fraction separated from whole blood and combined with 22% human serum albumin-0.6% NaCl (containing total albumin equivalent to 1.9 x that of the original plasma removed). Albumin concentration 19% and hematocrit 56–58% at time of freezing. Frozen in 33-mm. diameter cylindrical containers by spinning mechanically in −100° C. bath. Thawed mechanically at 45° C. and incubated ½ hr. at 37° C. Diluted by addition of plasma (1 vol.) to each 2 vol. of thawed blood.
All survivals by consecutive Chromium-51 procedure.

(B) PROTECTION BASED ON HUMAN SERUM ALBUMIN

Exploratory studies with small volumes of blood indicated that serum albumin afforded good protection to erythrocytes during freezing and thawing. Cohn's Fraction V was used for this purpose. Data are shown in Table III–25.

TABLE III–25.—FREEZE-THAW STUDIES WITH FRACTION V (COHN) AS THE PROTECTIVE ADDITIVE

| Samples | Percent Fraction V | Volume Frozen (cc) | Container | Percent Direct RBC Recovery | PVP-Saline EOP |
|---|---|---|---|---|---|
| 1 | 30 | 53 | BFF 19110 | 93 | 82 |
| 2 | 30 | 53 | BFF 19110 | 93 | 80 |
| 3 | 20 | 53 | BFF 19110 | 93 | 81 |
| 4 | 20 | 53 | BFF 19110 | 91 | 79 |
| 5 | 7 | 38 | BFT 3365 | 0 | |
| 6 | 12.5 | 38 | BFT 3365 | 0 | |
| 7 | 18 | 38 | BFT 3365 | 92 | 69 |
| 8 | 25 | 38 | BFT 3365 | 93 | 73 |

Resuspension: 1 volume of blood added to 9 volumes of isotonic 3.5% PVP (K-30) buffered to a pH of 7.4 and allowed to stand 2-4 hours.
Blood Preparation: Centrifuge citrated blood and remove plasma leaving 50% of the original volume as packed cells in residual plasma. Samples 1-4: Add to cells equal volume of physiological saline containing given quantity of Fraction V. Samples 5-8: Add to cells equal volume of physiological saline and Fraction V such that extra-cellular concentration of Fraction V is as given.
Freezing Condition: Blood in uncoated aluminum container agitated in liquid $N_2$.
Thawing Condition: Agitation in 45° C. water bath.

As a practical matter, serum albumin, because of its expense, would have to be used sparingly. It was decided that not more than twice the quantity of albumin normally present in a unit of collected blood would be used to provide a freeze-thaw protection. To achieve the necessary protective concentration required that cells be processed in a small volume of suspending medium. On thawing, the preparation could be diluted to a normal hematocrit and a normal protein level with saline solution. Therefore, post-thaw handling would involve a single, simple operation.

Further study showed that when the hematocrit before freezing exceeded 60% in the albumin-containing systems, red cell recovery was adversely affected. It was also found that a minimum concentration of 16% albumin in the suspending medium was necessary for maximum protection, the actual amount of albumin equaling that present in the volume of blood from which the cells were obtained. See Table III–26. The total amount of albumin present (another way of regarding the volume of medium in which the cells are suspended) influences recovery.

TABLE III–26.—RECOVERY OF ERYTHROCYTES FROZEN AND THAWED WITH A QUANTITY OF ALBUMIN EQUIVALENT TO THAT REMOVED WITH PLASMA

| Albumin Concentration in Additive (Percent) | Volume Additive per 4.5 cc. Cells (cc.) | Prefreeze Hematocrit (Percent) | PVP-Saline EOP (Percent) |
|---|---|---|---|
| 40 | 0.69 | 66.0 | 89 |
| 35 | .79 | 68.0 | 88 |
| 30 | 0.92 | 64.0 | 90 |
| 25 | 1.10 | 62.0 | 88 |
| 20 | 1.38 | 59.0 | 86 |
| 16 | 1.72 | 53.5 | 82 |
| 10 | 2.75 | 47.3 | 55 |
| Whole Blood | | 37.5 | 27 |
| Packed Cells | | 85.5 | 30 |

Cells: Blood in ACD-B from which 55% of the volume was removed as plasma.
Additive: Fraction V in physiological saline.
Volume Frozen: 5 cc. in 5 mm. aluminum envelopes.
Recovery: Analysis made after 15 minutes standing of the mixture of 1 volume of blood and 9 volumes of isotonic 3.5% PVP medium.

These findings led to more intensive investigation of the utility of albumin as an additive in a low temperature blood preservation process.

(1) *Chemical parameters.*—For invitro studies and optimization both Fraction V, a plasma-protein fraction consisting primarily of albumin, and clinical serum albumin were used.

In specifying the quantity of albumin used in a blood preparation, we generally use the term "albumin factor (A.F.)." This is the ratio of the quantity of albumin used to protect a given number of red cells to the quantity of albumin normally associated with these cells in vivo. An average concentration of 2.4 gm. of albumin per 100 cc. of blood collected with ACD-B was used as the norm.

To reduce this prefreeze handling of the blood a volume of diluent was added to the ACD-B blood which was then centrifuged at a force of $12,000 \times G$ to assist in the packing of cells and thus in the removal of plasma. Diluents used were solutions of physiological saline, 10% lactose, 0.2 M glucose in physiological saline and an isotonic phosphate buffer. To the diluents were added equal volumes of blood and, after mixing and equilibration, the mixtures were centrifuged and the supernatant poured off. A predetermined volume of 25% Fraction V solution was added to each of the packed cell samples and 5 cc. of the resultant mixture frozen and thawed stagnantly in 5 mm. aluminum envelopes. Resuspension EOP's for all samples were approximately 90% for a 10-fold dilution in 2.5% PVP solution and 70–75% for a 100-fold dilution in physiological saline.

The results suggested the possible feasibility of this process. In subsequent studies an essentially extracellular material, mannitol, was used as the blood diluent.

Red cell volumes may be altered by the addition of mannitol solutions to whole blood. By judiciously selecting appropriate concentrations of mannitol it is possible to control the hematocrit of the blood-mannitol mixture and, hence, the amount of supernatant removable on centrifugation. In this manner it is possible to prepare erythrocyte-albumin mixtures of varying extracellular protein concentration by adding to erythrocytes treated with mannitol a stock solution of concentrated human serum albumin.

For the preliminary studies with mannitol one volume of ACD-B blood was added to an equal volume of the diluent containing from 1.0% to 12.5% mannitol in distilled water. The resultant mixtures were centrifuged at a force of $12,000 \times G$ and the supernatant removed. The diluents containing less than 2.5% mannitol caused cells to hemolyze. To each of the remaining packed-cell units was added a volume of 25% solution of albumin equivalent to a quantity of albumin approximately 1.5 times that removed with the plasma. According to approximate calculations the extracellular concentration of albumin in the mixtures to be frozen ranged from 13 to 22%.

Five-cc samples were frozen and thawed in 5-mm aluminum envelopes and incubated for 30 minutes at 37° C. Aliquots of the blood were then diluted 10 fold in isotonic 3.5% PVP and 100 fold in physiological saline. The differences in cell recovery were slight; however, the best results occured with the use of 5% mannitol for which EOP's in PVP and saline were 92% and 79% respectively.

With 5% mannitol solution and high speed centrifugation ($12,000 \times G$), as a means for separating plasma from cells, several tests were run to determine the optimum concentration of phosphates required in the albumin additive to provide maximum freeze-thaw protection and post-thaw stability for the cells. Solutions of physiological saline, isotonic phosphate buffer, and combinations of both, containing 25% Fraction V were used as additives. The results presented in Table III–27 indicate that only a small amount of phosphate is necessary to provide maximum recovery and stability of frozen and thawed cells. Although not tabulated these experiments reconfirmed the point that a post-thaw incubation period of 30 minutes at 37° C. improved cell stability on resuspension.

TABLE III-27.—BLOOD TREATMENT WITH 5% MANNITOL SOLUTION: DETERMINATION OF PHOSPHATE REQUIREMENTS IN THE FRACTION V ADDITIVE

| Volume Ratio in Additive Saline: Phosphate Buffer (Isotonic) | In Vitro Age of Blood (days) | Efficiency of Process (Percent) | | | |
|---|---|---|---|---|---|
| | | Saline | | 3.5% PVP | |
| | | Immediate | Overnight (Storage at 4° C.) | Immediate | Overnight (Storage at 4° C.) |
| 5:0 | 2 | 81.5 | 75.5 | 94.4 | 92.8 |
| 4:1 | 2 | 80.0 | 77.1 | 93.7 | 92.3 |
| 3:2 | 2 | 79.2 | 75.0 | 93.4 | 92.0 |
| 2:3 | 2 | 76.8 | 73.4 | 92.4 | 89.9 |
| 1:4 | 2 | 76.8 | 72.4 | 92.3 | 90.3 |
| 0:5 | 2 | 75.8 | 73.0 | 91.5 | 89.2 |
| 5:0 | 3 | 83.5 | 79.7 | 93.7 | 92.7 |
| 9:1 | 3 | 81.0 | 79.2 | 93.9 | 94.2 |

Blood Dilution: 1 volume ACD-B blood with 1 volume 5% mannitol. Additive: 25% Fraction V in isotonic solutions with physiological saline: isotonic phosphate buffer ratios as tabulated. A volume of additive containing approximately 1.4 times the albumin removed from the cells with the plasma was added to the packed cells.
Phosphate Buffer: 11.32 gm. $NaH_2PO_4 \cdot H_2O$ and 16.25 gm. $Na_2HPO_4 \cdot 12 H_2O$ in 1 liter of solution.
Processing Conditions: 5 cc. volumes in 5 mm. aluminum envelopes frozen by immersion with gentle agitation in water at 45° C. for 90 sec. followed by incubation at 37° C. for ½ hr. Saline: 100-fold dilution in physiological saline. 2.5% PVP: 10-fold dilution in isotonic 3.5% PVP solution. All analyses ½ hour after dilution of thawed blood.

Further experiments were conducted to determine whether or not other diluent fluids could be used as successfully as mannitol. Samples of blood drawn into ACD-B anticoagulant were diluted with equal volumes of 5% mannitol, physiological saline or isotonic phosphate buffer of pH 6.4 prior to centrifugation of the samples at 12,000×G for plasma separation. A volume of 25% Fraction V solution containing 1.4 times the quantity of albumin removed with the plasma was used as the protective additive. Portions of the blood samples (frozen in 5 cc. quantities) were resuspended in 9 volumes of isotonic 3.5% PVP solution and in 99 volumes of physiological saline immediately after thawing and after ½-hour incubation of the thawed blood at 37° C. The thawed samples, both with and without incubation, were then stored at 4° C. overnight and aliquots of each again resuspended. In all cases the incubated samples gave better recoveries. These results are tabulated in Table III-28. The evidence indicates that a major portion of the plasma of whole blood should be removed prior to addition of albumin to attain good recoveries of frozen and thawed cells. It is possible that saline or buffer concentrations could be optimized to provide cell recoveries equivalent to that provided with mannitol. However, the use of 5% mannitol and additive prepared in physiological saline gave the best immediate results. Hence, this system was used as a control in many of the subsequent tests to improve yields and study methods for freezing and thawing 30–50 cc. samples of blood. In Table III-29 are presented the resuspension recoveries of the cells frozen and thawed in this control system during a period of one month. For blood drawn into ACD-B or ACD-A the results were quite reproducible. Blood drawn through an ion-exchange column to prevent coagulation is not stable in vitro and this instability is reflected in the freeze-thaw and resuspension yields of intact red cells.

TABLE III-28.—COMPARISON OF DILUENT FLUIDS

| Whole Blood Diluent | Additive | Efficiency of Process (Percent) | | | |
|---|---|---|---|---|---|
| | | 1:9 PVP | | 1:99 Saline | |
| | | Immediate | Overnight (Storage at 4° C.) | Immediate | Overnight (Storage at 4° C.) |
| A | 1 | 94 | 93 | 83.5 | 80 |
| A | 2 | 94 | 94 | 81 | 79 |
| B | 1 | 92 | 91.5 | 80 | 78 |
| B | 2 | 93 | 91.5 | 81 | 78 |
| C | 1 | 93 | 91 | 80.5 | 78 |
| C | 2 | 92 | 91 | 80 | 78 |

Diluent: 1 volume blood, drawn into ACD-B, was added to volume 1 diluent prior to centrifugation at 12,000×G.
  A = 5% mannitol.
  B = physiological saline.
  C = isotonic phosphate buffer of pH=6.4.
Additive: 2 cc. for cells from initial 15 cc. of ACD-B blood.
  1 = 25% Fraction V is physiological saline.
  2 = 25% Fraction V is a solution of 9 volumes.
Saline and 1 volume phosphate buffer.
Processing Conditions: 5 cc. volumes in 5 mm. aluminum envelopes frozen by immersion with gentle agitation in liquid nitrogen and thawed by immersion with gentle agitation in water at 45° C. for 90 sec. followed by incubation at 37° C. for ½ hour.
Resuspension: Dilutions (blood:medium) as shown in isotonic 3.5% PVP and physiological saline. Analysis for free hemoglobin ½ hour after resuspension.

TABLE III-29.—RECOVERIES OF RED CELLS PACKED USING MANNITOL AND FROZEN AND THAWED WITH 25% FRACTION V IN SALINE

| Anticoagulant | In Vitro Age of Blood (days) | Efficiency of Process (percent) | |
|---|---|---|---|
| | | In PVP | In Saline |
| ACD-B | 2 | 94.4 | 81.5 |
| Ion Exchange [a] | 1 | 88.6 | 79.1 |
| Do. [a] | 2 | 84.7 | 61.0 |
| ACD-B | 3 | 93.7 | 83.5 |
| ACD-B | 5 | 94.6 | 84.0 |
| ACD-B | 1 | 94.5 | 84.2 |
| ACD-B | 1 | 95.7 | 86.2 |
| ACD-A | 1 | 94.7 | 84.0 |
| ACD-B | 0 | 94.0 | 81.4 |
| ACD-B | 1 | 94.8 | 82.5 |
| ACD-A | 3 | 95.0 | 83.5 |

[a] Ion Exchange blood had as additive an amount of albumin equal to 1.1 instead of 1.4 times that quantity removed in the plasma. A volume of blood was added to an equal volume of 5% mannitol before centrifugation.
Samples frozen in liquid $N_2$ in 5 cc. quantities, and thawed by immersion with gentle agitation in water at 45° C., followed by incubation for ½ hour at 37° C.
Resuspension Recovery: Thawed blood diluted with resuspension media and analyzed for free hemoglobin after ½-hour standing.
PVP: 10-fold dilution with isotonic 3.5% PVP. Saline: 100-fold dilution with physiological saline.

The potential use of mannitol solutions to dehydrate erythrocytes, which would permit the use of salt-poor additives, was investigated. As a preliminary experiment whole blood was added to equal volumes of mannitol solutions ranging in concentration from 10 to 15%. Each of these mixtures was divided into 5 equal aliquots which were then centrifuged and the supernatant removed. To each aliquot of packed cells was added a quantity of distilled water or saline containing up to 0.85% NaCl, equivalent to that volume of 25% Fraction V additive which would be used to preserve the cells. Subsequent observations showed that the colors of the supernatants of the various samples were equivalent, thus indicating the feasibility of using hypotonic additives without hemolyzing cells prior to freezing.

(2) *Process development.*—To freeze and thaw quantities of blood sufficient for clinical evaluation, with in vitro recoveries equivalent to those attained in 5 cc. volumes, was the next objective. Two methods of freezing were evaluated. In the first, 30 cc. of the high hematocrit blood preparations were frozen in rectangular aluminum containers of 75 cc. capacity with rapid shaking; in the second 22 cc. were frozen in a 33 mm. cylindrical container rotating about its axis at about 1800 r.p.m.

After extensive heat transfer studies it was found that a wide range of cooling conditions were possible by using a liquid bath at a preset temperature and by spraying the container with liquid nitrogen, or a mixture of liquid and gaseous nitrogen. For rapid shaking, cooling rates were controlled with container coatings.

Final results prior to in vivo testing are presented in Table III-30.

TABLE III-30.—IN-VITRO RECOVERY OF RED CELLS PROCESSED BY SPIN-FREEZING WITH SERUM ALBUMIN AS PRESERVATIVE

| Sample | Normalized Recovery (percent) | Saline Resuspension Recovery (percent) |
|---|---|---|
| 1 | 92 | 81 |
| 2 | 93 | 81 |
| 3 | 93 | 79 |
| 4 | 93 | 82 |
| 5 | 94 | 79 |
| 6 | 92 | 82 |
| 7 | 92 | 79 |
| 8 | 92 | |
| 9 | 92 | 76 |
| 10 | 94 | 84 |
| 11 | 93 | 80 |
| 12 | 93 | 79 |
| 13 | | |

Blood: Drawn into ACD-B.
Additive: Solution of 22% serum albumin, 0.6% NaCl. Albumin Factor of 1.9.
Freezing Conditions: 22 cc. of packed cells frozen in a 33 mm. tubular container. Samples 1–10 frozen in −80 to −100° C. liquid and samples 11–13 frozen in liquid nitrogen jets.
Thawing Conditions: Stagnant thaw 2 minutes at 45° C. plus 28 minutes at 37° C.
Normalization: 1 volume of plasma added to 1 volume of thawed preparation.
Saline Resuspension: 1 volume of normalized blood diluted to 100 volumes with physiological saline then allowed to stand ½ hour prior to analysis for free hemoglobin.

What is claimed is:

1. A process for freezing erythrocytes in bulk quantities which comprises providing in a container a mixture of erythrocytes and an aqueous medium containing at least about 10 weight percent based on the weight of the medium of a high molecular weight, water soluble polymer extracellular protective additive, immersing said container in a refrigerant bath at a temperature not warmer than about −100° C. and tubulently agitating said mixture such that the rate of heat transfer is at least 14,000 B.t.u./(hr.) (sq. ft. of container surface) and continuing such refrigerative contact for a sufficient duration to form a frozen shell of said mixture on the inner surfaces of said container.

2. A process according to claim 1 wherein said extracellular protective additive is present at a final mixture concentration of between about 3–20% w./v.

3. A process according to claim 2 wherein the polymeric protective additive is selected from the group consisting of polyvinylpyrrolidone, dextran, and albumin at a final mixture concentration of between about 10–20% w./v.

4. A process according to claim 3 wherein said polymeric protective additive is polyvinylpyrrolidone at a final mixture concentration of about 15% w./v.

5. A process according to claim 1 wherein said erythrocytes are provided as components of a unit of whole blood of at least ½ pint quantity.

6. A process according to claim 5 wherein said extracellular protective additive is present at a final mixture concentration between about 3–20% w./v.

7. A process according to claim 6 wherein the polymeric protective additive is selected from the group consisting of polyvinylpyrrolidone, dextran, and albumin at a final mixture concentration between about 5–15% w./v.

8. A process according to claim 7 wherein said polymeric protective additive is polyvinylpyrrolidone at a final mixture concentration of 7% w./v.

9. A process according to claim 1 wherein said medium further includes plasma; and wherein said extracellular protective additive is present at a final mixture concentration of between about 3–20% w./v.

10. A process according to claim 9 wherein said medium includes plasma at a concentration of between about 15–30% by volume of the medium present with said erythrocytes and a polymeric protective additive selected from the group consisting of polyvinylpyrrolidone, dextran, and albumin at a final mixture concentration of 10–20% w./v.

11. A process according to claim 10 wherein the ratio of the medium present with said erythrocytes to said erythrocytes is 1–2 volumes medium per volume of erythrocytes; wherein said plasma is provided at a concentration of 50% by volume of the medium; and wherein said polymeric protective additive comprises polyvinylpyrrolidone at a final mixture concentration of 13% w./v.

12. A process according to claim 9 wherein said polymeric protective additive comprises polyvinylpyrrolidone at a final mixture concentration of 5–10% w./v. and albumin at a concentration in said medium of at least 2.5% w./v.

13. A process according to claim 1 wherein said erythrocytes are provided as components of a unit of whole blood of at least ½ pint quantity; wherein said extracellular protective additive is present at a final mixture concentration of 3–20% w./v.; and including the step of removing a portion of water from said medium prior to freezing to provide a reduced volume mixture for freezing containing the original quantity of erythrocytes.

14. A process according to claim 13 wherein the reduced volume final mixture concentration of polymeric additive is between about 3–4% w./v.

References Cited

UNITED STATES PATENTS 2,225,774  12/1940  Flosdorf _____ 167—78.5

OTHER REFERENCES

Meryman et al.: Research Report, Project NM 00 0018.01.10; Naval Medical Research Institute, National Naval Medical Center, Bethesda, Maryland; volume 13, pages 953–963, December 19, 1955.

ALBERT T. MEYERS, *Primary Examiner*.

JULIAN S. LEVITT, SAM ROSEN, *Examiners*.

L. B. RANDALL, *Assistant Examiner*.